US010374665B2

(12) United States Patent
Zavadsky et al.

(10) Patent No.: US 10,374,665 B2
(45) Date of Patent: *Aug. 6, 2019

(54) DISTRIBUTED ANTENNA SYSTEM WITH DYNAMIC CAPACITY ALLOCATION AND POWER ADJUSTMENT

(71) Applicant: CommScope Technologies LLC, Hickory, NC (US)

(72) Inventors: Dean Zavadsky, Shakopee, MN (US); Larry G. Fischer, Waseca, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/972,890

(22) Filed: May 7, 2018

(65) Prior Publication Data

US 2018/0254804 A1 Sep. 6, 2018

Related U.S. Application Data

(63) Continuation of application No. 14/534,810, filed on Nov. 6, 2014, now Pat. No. 9,967,003.

(51) Int. Cl.
*H04B 7/04* (2017.01)
*H04W 88/08* (2009.01)
*H04W 72/04* (2009.01)

(52) U.S. Cl.
CPC ............ *H04B 7/04* (2013.01); *H04W 88/085* (2013.01); *H04W 72/046* (2013.01)

(58) Field of Classification Search
CPC ..... H04B 7/04; H04W 88/085; H04W 72/046
(Continued)

(56) References Cited

U.S. PATENT DOCUMENTS 5,682,256 A 10/1997 Motley et al.
5,809,422 A 9/1998 Raleigh et al.
(Continued)

FOREIGN PATENT DOCUMENTS

KR 20140004548 A 1/2014

OTHER PUBLICATIONS

"MIKOM U.S. Announces Immediate Availability of Multiple Solutions for the Most Flexible Wireless Signal Distribution System: The Base Station Hotel", "PRNewswire; downloaded from http://www.prnewswire.com/news-releases/mikom-us-announces-immediate-availability-of-multiple-solution-for-the-most-flex", Jan. 13, 2003, pp. 1-2, Publisher: United Business Media.
(Continued)

*Primary Examiner* — Melvin C Marcelo
*Assistant Examiner* — Natali Pascual Peguero
(74) *Attorney, Agent, or Firm* — Fogg & Powers LLC

(57) ABSTRACT

A distributed antenna system (DAS) includes host that receives downstream signals corresponding to radio frequency (RF) channel and remote antenna units (RAUs) communicatively coupled to host. Host communicates downstream transport signal derived from downstream signals received at host to RAUs. Each RAU uses downstream transport signal to generate downstream RF signal for radiation from antenna associated with RAU. Downstream RF signal comprises a subset of plurality of downstream frequency bands. Each RAU receives upstream RF signal including respective RF channel. Each RAU communicates upstream transport signal derived from upstream RF signal to host. Host uses upstream transport signal to generate upstream signal including at least one upstream frequency band. Host analyzes attribute of downstream and upstream transport signals associated with RAUs, correlates analyzed attribute for each RAU with profile, and determines current
(Continued)

capacity usage of RAUs based on correlation. Host dynamically allocates capacity amongst RAUs based on current capacity usage.

22 Claims, 22 Drawing Sheets

(58) Field of Classification Search
USPC .................................. 370/310, 329, 330
See application file for complete search history.

(56) References Cited

U.S. PATENT DOCUMENTS

| | | | |
|---|---|---|---|
| 6,826,163 | B2 | 11/2004 | Mani et al. |
| 6,826,164 | B2 | 11/2004 | Mani et al. |
| 7,127,175 | B2 | 10/2006 | Mani et al. |
| 7,313,415 | B2 | 12/2007 | Wake et al. |
| 7,548,695 | B2 | 6/2009 | Wake |
| 9,967,003 | B2 | 5/2018 | Zavadsky et al. |
| 2005/0111376 | A1* | 5/2005 | Raghothaman ...... H04B 7/0417 370/252 |
| 2006/0013290 | A1* | 1/2006 | Oura .................... H04B 1/7113 375/148 |
| 2006/0166676 | A1 | 7/2006 | Rajkotia et al. |
| 2007/0147294 | A1 | 6/2007 | Bose et al. |
| 2008/0076406 | A1 | 3/2008 | Chen et al. |
| 2008/0076435 | A1 | 3/2008 | Chen et al. |
| 2010/0178929 | A1 | 7/2010 | Kennedy, Jr. et al. |
| 2012/0039320 | A1* | 2/2012 | Lemson ................ H03F 1/3247 370/338 |
| 2012/0329523 | A1* | 12/2012 | Stewart ................ H03F 1/3247 455/562.1 |
| 2014/0010548 | A1 | 1/2014 | Berlin et al. |
| 2014/0031049 | A1 | 1/2014 | Sundaresan et al. |
| 2014/0140225 | A1 | 5/2014 | Wala |
| 2014/0162664 | A1 | 6/2014 | Stapleton et al. |
| 2014/0269318 | A1 | 9/2014 | Hasarchi et al. |
| 2014/0286247 | A1 | 9/2014 | Lemson et al. |

OTHER PUBLICATIONS

"Tekmar Eases mobile Traffic Congestion At Olympic Games", "Downloaded from http://www.telecompaper.com/news/tekmar-eases-mobile-traffic-congestion-at-olympic-games, on May 6, 2011", Sep. 8, 2000, p. 1 Publisher: Telecompaper.

"The Vanu Anywave Base Station Subsystem", "http://www.vanu.com/documents/technology/vanu-anywave-2006-05.pdf, downloaded on May 6, 2011", Apr. 2006, pp. 1-10, Publisher: Vanu, Inc.

European Patent Office, "Extended European Search Report from EP Application No. 15856642.2 dated Apr. 23, 2018", from Foreign Counterpart to U.S. Appl. No. 14/534,810, dated Apr. 23, 2018, pp. 1-10, Published: EP.

International Bureau, "Notification Concerning Transmittal of International Preliminary Report on Patentability from PCT Application No. PCT/US2015/059427 dated May 18, 2017", from Foreign Counterpart to U.S. Appl. No. 14/534,810, dated May 18, 2017, pp. 1-8, Published: WO.

International Searching Authority, "Notification of Transmittal of the International Search Report and the Written Opinion from PCT Application No. PCT/US2015/059427 dated Feb. 24, 2016", from Foreign Counterpart to U.S. Appl. No. 14/534,810, dated Feb. 24, 2016, pp. 1-11, Published: WO.

Kalfas et al., "An Agile and Medium-Transparent MAC Protocol for 60 GHz Radio-Over-Fiber Local Access Networks", "Journal of Lightwave Technology", Aug. 15, 2010, pp. 2315-2326, vol. 28, No. 16, Publisher: IEEE.

"Allen Telecom's Radio-Over-Fiber Technology Powers Mobile Communications at Olympics", "downloaded from http://www.wirelessnetworksonline.com/article.mvc/Allen-Telecoms-radio-over-fiber-technology-po-0001 on May 6, 2011", Sep. 29, 2000, p. 1 Published: VertMarkets Inc.

Seeds, "Broadband Access Using Wireless Over Fibre Systems", "http://www.ee.ucl.ac.uk/isis/notes/ISIS1.pdf, downloaded May 6, 2011", at least as early as Oct. 17, 2007, pp. 1-43, Publisher: Department of Electronic & Electrical Engineering, University College London.

Seeds, "Wireless Access Using Microwave Photonics", "http://cfp.mit.edu/publications/CFP_Presentations/Jun04/Seeds_6-04.pdf, downloaded on May 6, 2011,", at least as early as Jun. 22, 2004, pp. 1-27, Publisher: Department of Electronic & Electrical Engineering, University College London.

U.S. Patent and Trademark Office, "Applicant-Initiated Interview Summary", U.S. Appl. No. 14/534,810, dated Sep. 8, 2017, pp. 1-15, Published: US.

U.S. Patent and Trademark Office, "Final Office Action", U.S. Appl. No. 14/534,810, dated May 5, 2017, pp. 1-36, Published: US.

U.S. Patent and Trademark Office, "Notice of Allowance", U.S. Appl. No. 14/534,810, dated Jan. 2, 2018, pp. 1-5, Published: US.

U.S. Patent and Trademark Office, "Office Action", U.S. Appl. No. 14/534,810, dated Sep. 16, 2016, pp. 1-43, Published: US.

Wake, "Trends and Prospects for Radio Over Fibre Picocells", "2002 International Topical Meeting on Microwave Photonics", at least as early as Jan. 8, 2002, pp. 21-24, Publisher: Department of Electronic & Electrical Engineering, University College London.

European Patent Office, "Communication pursuant to Article 94(3) from EP Application No. 15856642.2 dated Feb. 15, 2019", from Foreign Counterpart to U.S. Appl. No. 14/534,810, pp. 1-5, Published: EP.

Australian Government IP Australia, "Examination report No. 1 from AU Application No. 2015342917 dated Mar. 18, 2019", from Foreign Counterpart to U.S. Appl. No. 14/534,810, pp. 1-4, Published: AU.

* cited by examiner

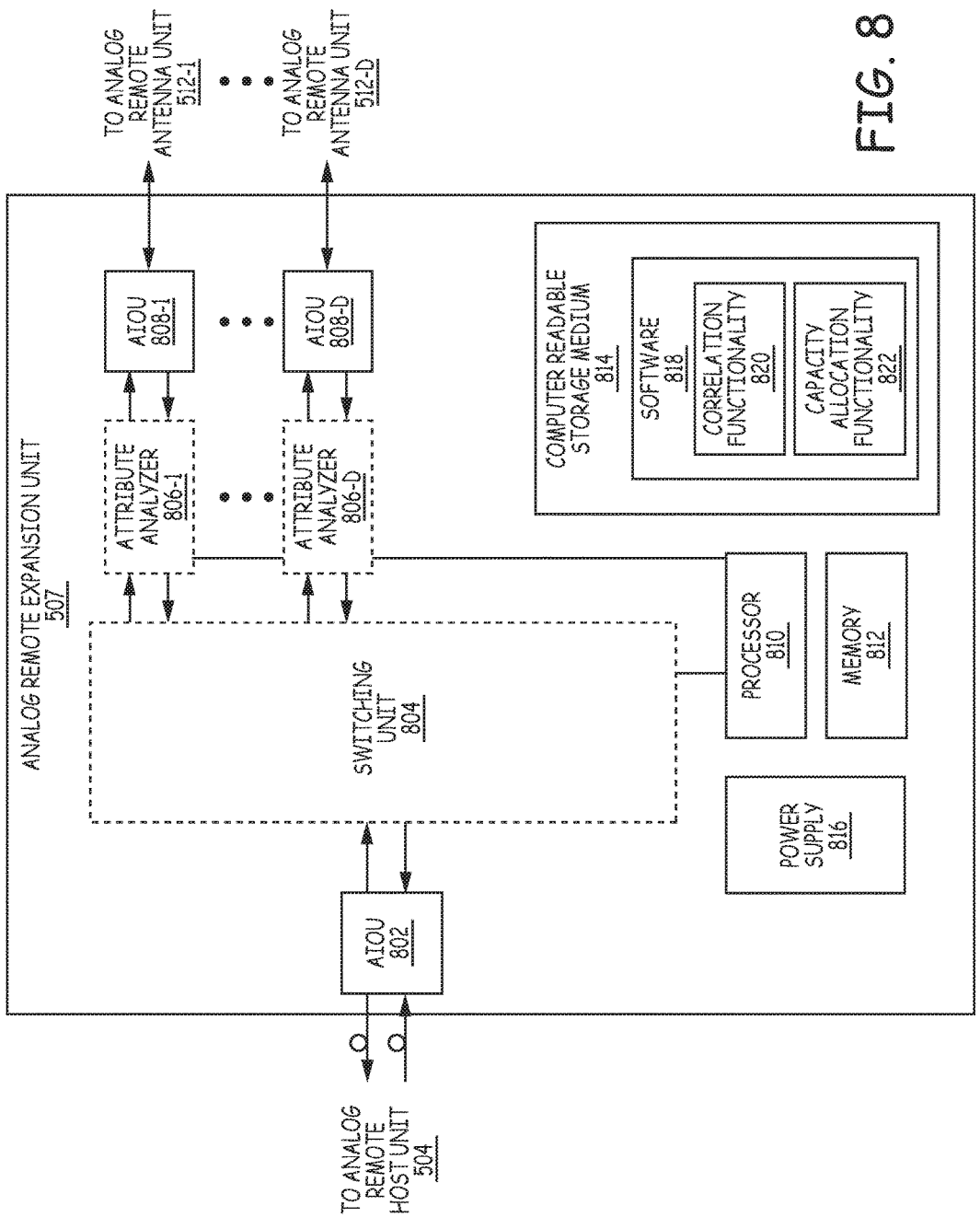

is a continuation of U.S. patent application

DISTRIBUTED ANTENNA SYSTEM WITH DYNAMIC CAPACITY ALLOCATION AND POWER ADJUSTMENT

CROSS-REFERENCE TO RELATED APPLICATION

This application is a continuation of U.S. patent application Ser. No. 14/534,810, filed Nov. 6, 2014 and titled "DISTRIBUTED ANTENNA SYSTEM WITH DYNAMIC CAPACITY ALLOCATION AND POWER ADJUSTMENT", the contents of which is incorporated herein by reference.

BACKGROUND

One way that a wireless cellular service provider can improve the coverage provided by a given base station or group of base stations is by using a distributed antenna system (DAS). In a DAS, radio frequency (RF) signals are communicated between a host unit and one or more remote antenna units (RAUs). The host unit can be communicatively coupled to one or more base stations directly by connecting the host unit to the base station using, for example, coaxial cabling. The host unit can also be communicatively coupled to one or more base stations wirelessly, for example, using a donor antenna and a bi-directional amplifier (BDA).

RF signals transmitted from the base station (also referred to here as "downlink RF signals") are received at the host unit. The host unit uses the downlink RF signals to generate a downlink transport signal that is distributed to one or more of the RAUs. Each such RAU receives the downlink transport signal and reconstructs the downlink RF signals based on the downlink transport signal and causes the reconstructed downlink RF signals to be radiated from at least one antenna coupled to or included in the RAU. A similar process is performed in the uplink direction. RF signals transmitted from mobile units (also referred to here as "uplink RF signals") are received at each RAU. Each RAU uses the uplink RF signals to generate an uplink transport signal that is transmitted from the RAU to the host unit. The host unit reconstructs the uplink RF signals received at the RAUs and communicates the reconstructed uplink RF signals to the base station. In this way, the coverage of the base station can be expanded using the DAS.

One or more intermediate devices (also referred to here as "expansion hosts" or "expansion units") can be placed between the host unit and the remote antenna units in order to increase the number of RAUs that a single host unit can feed and/or to increase the host-unit-to-RAU distance.

SUMMARY

A distributed antenna system includes a host unit operable to receive downstream signals corresponding to a plurality of downstream frequency bands, each of the plurality of downstream frequency bands associated with a respective radio frequency channel; and a plurality of remote antenna units that are communicatively coupled to the host unit. The host unit is operable to communicate a downstream transport signal from the host unit to at least a first subset of the plurality of remote antenna units, wherein the downstream transport signal is derived from at least one of the downstream signals received at the host unit. Each remote antenna unit of the first subset is operable to use the downstream transport signal to generate a downstream radio frequency signal for radiation from an antenna associated with the remote antenna unit, wherein the downstream radio frequency signal comprises at least a subset of the plurality of downstream frequency bands. Each remote antenna unit of the first subset is further operable to receive an upstream radio frequency signal comprising at least one upstream frequency band, each upstream frequency band associated with a respective radio frequency channel. Each remote antenna unit of the subset of the plurality of remote antenna units is further operable to communicate an upstream transport signal to the host unit, wherein the upstream transport signal is derived from the upstream radio frequency signal. The host unit uses the upstream transport signal to generate an upstream signal, wherein the upstream signal comprises the at least one upstream frequency band. The host unit is further operable to analyze an attribute of at least one of the downstream transport signals and the upstream transport signals associated with the plurality of remote antenna units. The host unit is further operable to correlate the analyzed attribute for each of the plurality of remote antenna units with a profile. The host unit is further operable to determine the current capacity usage of the plurality of remote antenna units based on the correlation. The host unit is further operable to dynamically allocate capacity amongst the plurality of remote antenna units based on the determined current capacity usage.

DRAWINGS

FIG. 8 is a block diagram of an exemplary embodiment of the analog expansion unit shown in FIG. 5.

Figure 1:
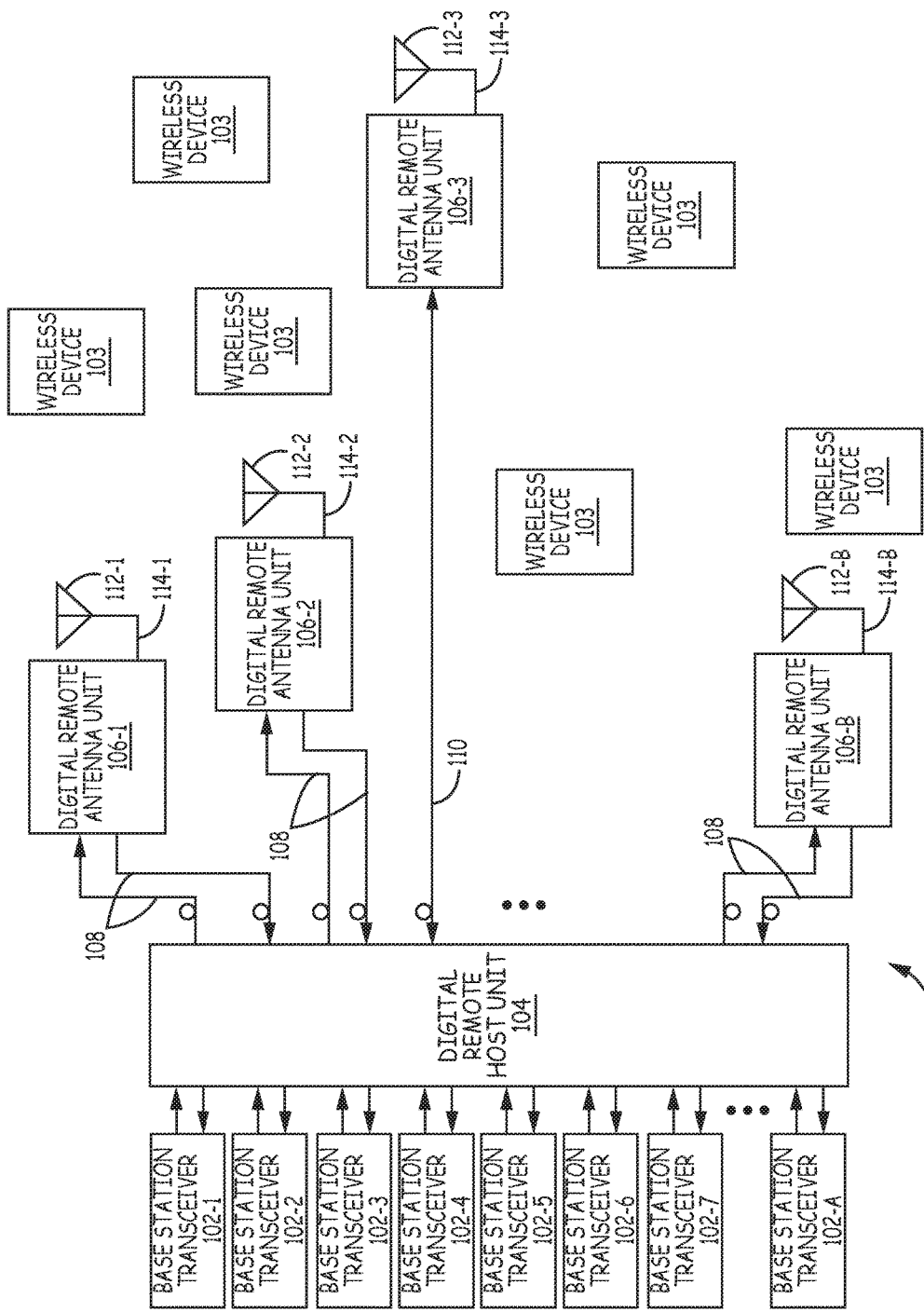
FIG. 1 is a block diagram of one exemplary embodiment of a digital distributed antenna system.
Figure 2:
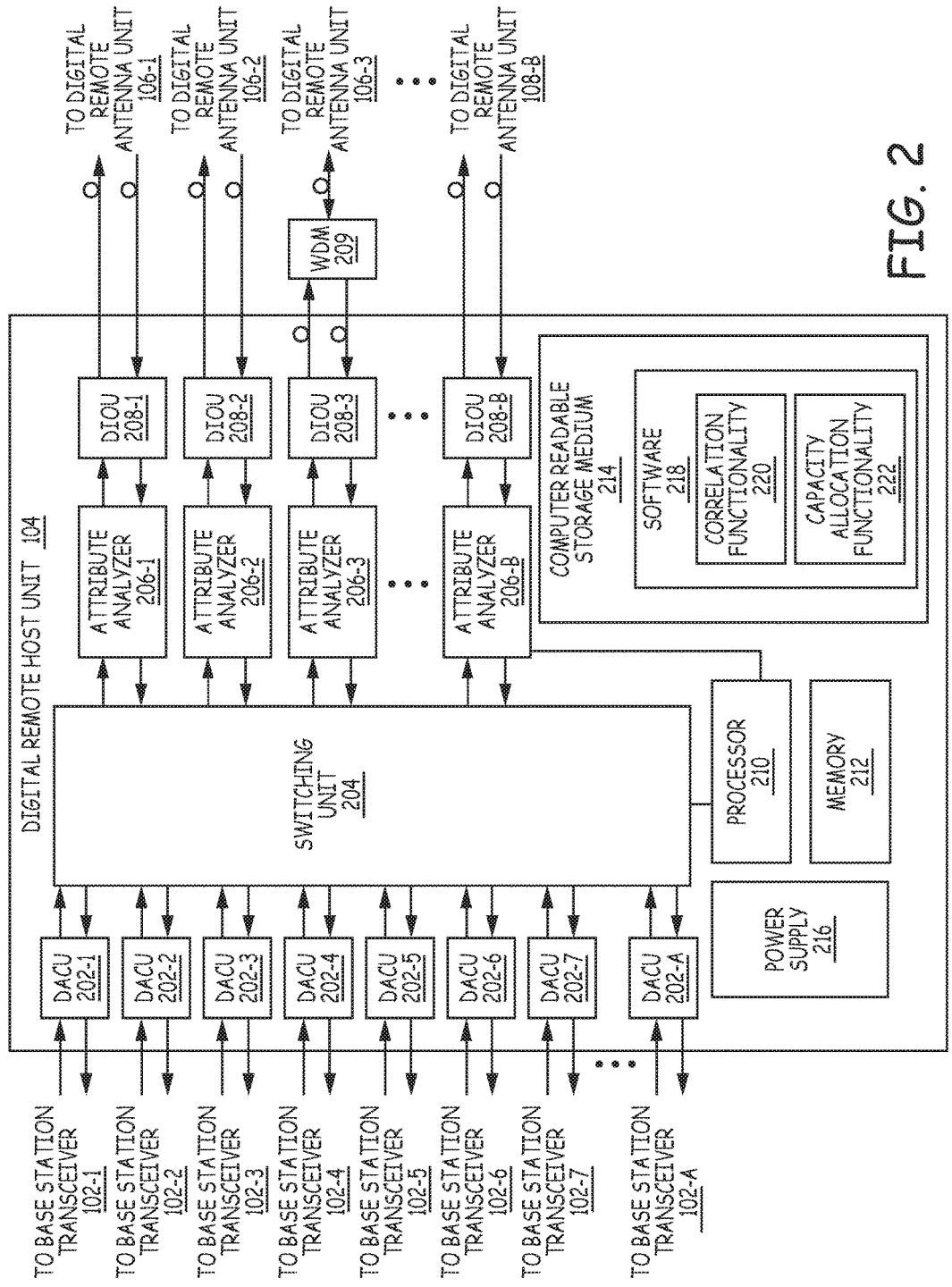
FIG. 2 is a block diagram of an exemplary embodiment of the digital remote host unit shown in FIG. 1.
Figure 5:
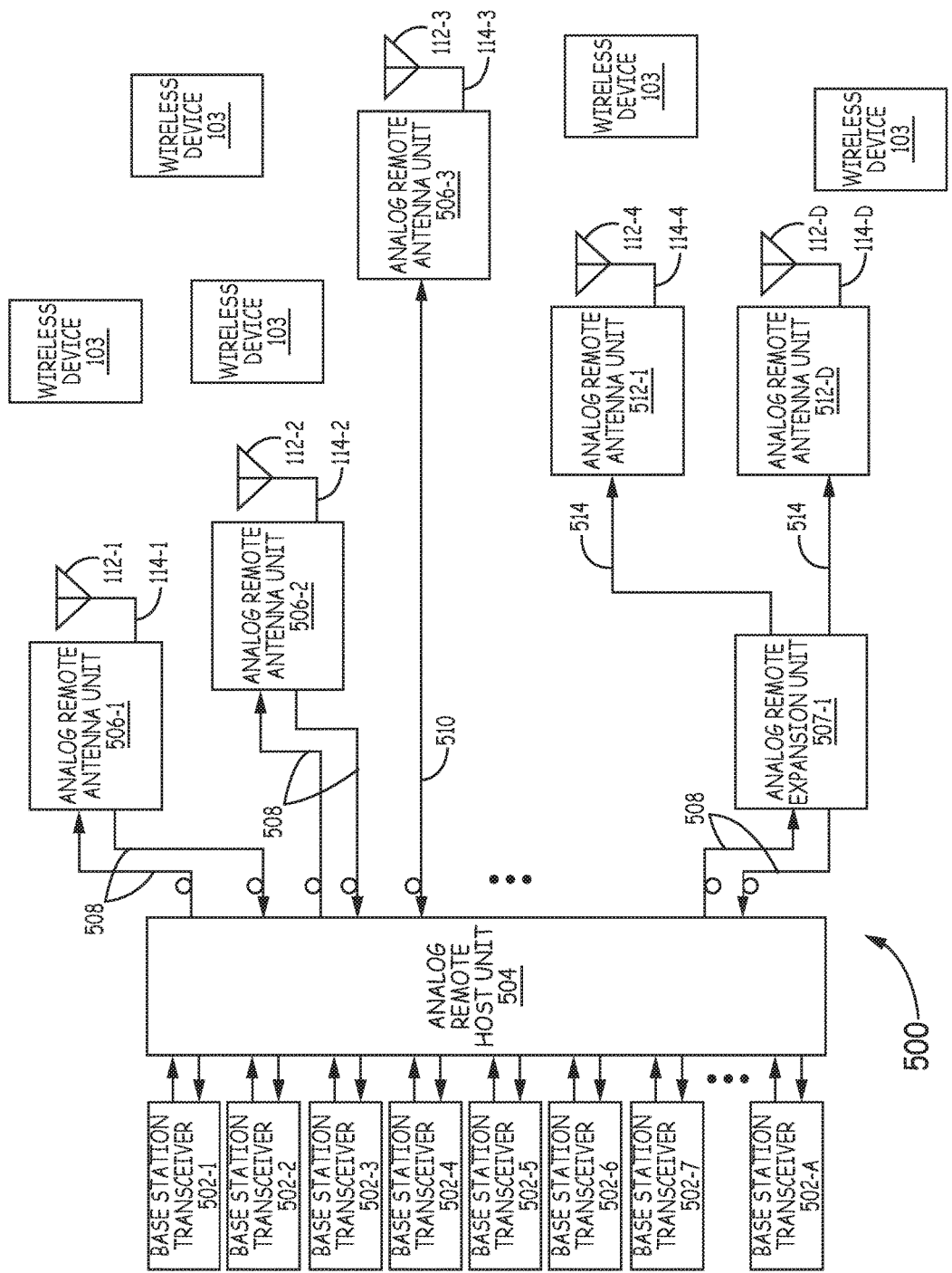
FIG. 5 is a block diagram of one exemplary embodiment of an analog distributed antenna system.
Figure 6:
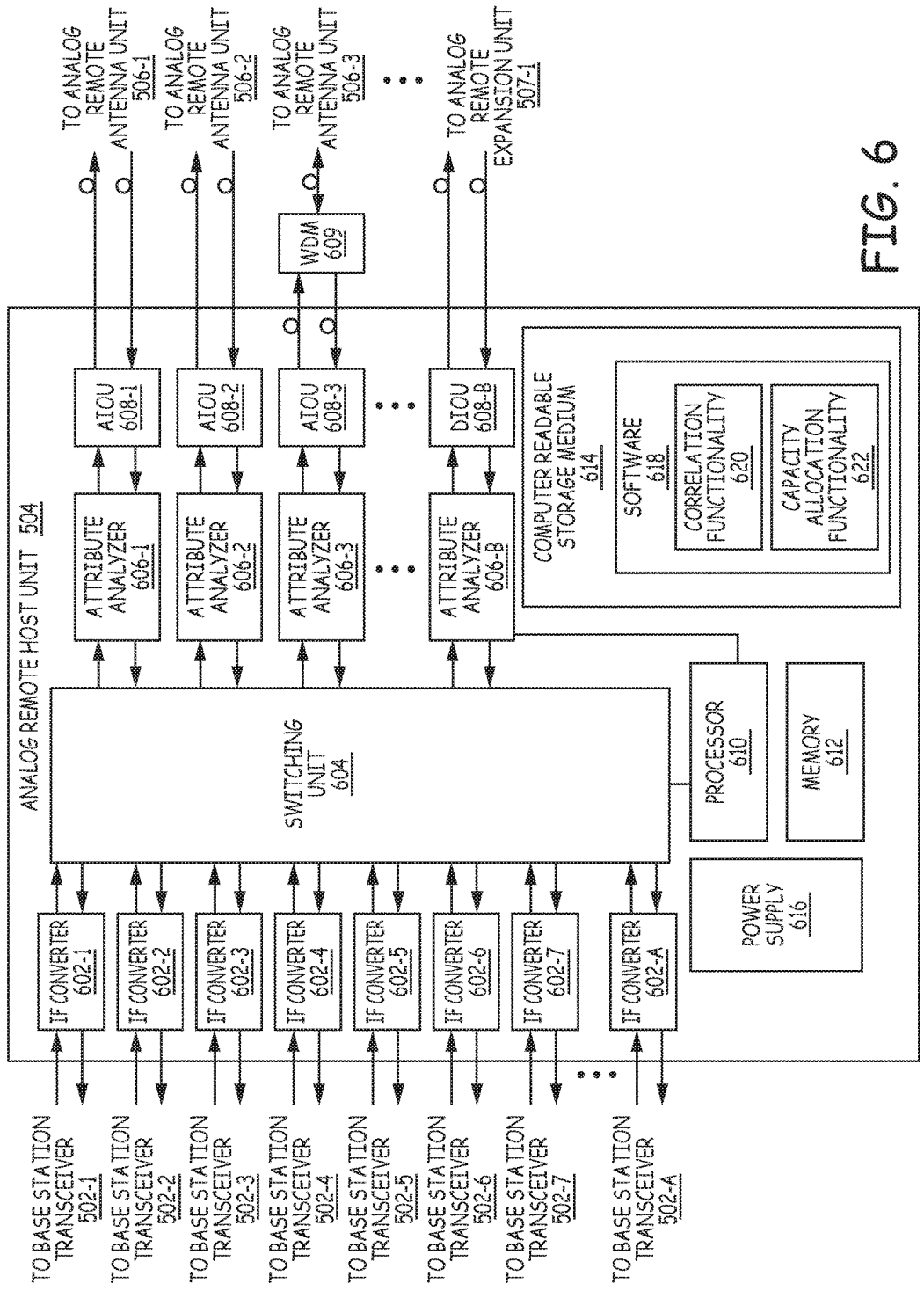
FIG. 6 is a block diagram of an exemplary embodiment of the analog remote host unit shown in FIG. 5.
Figure 10:
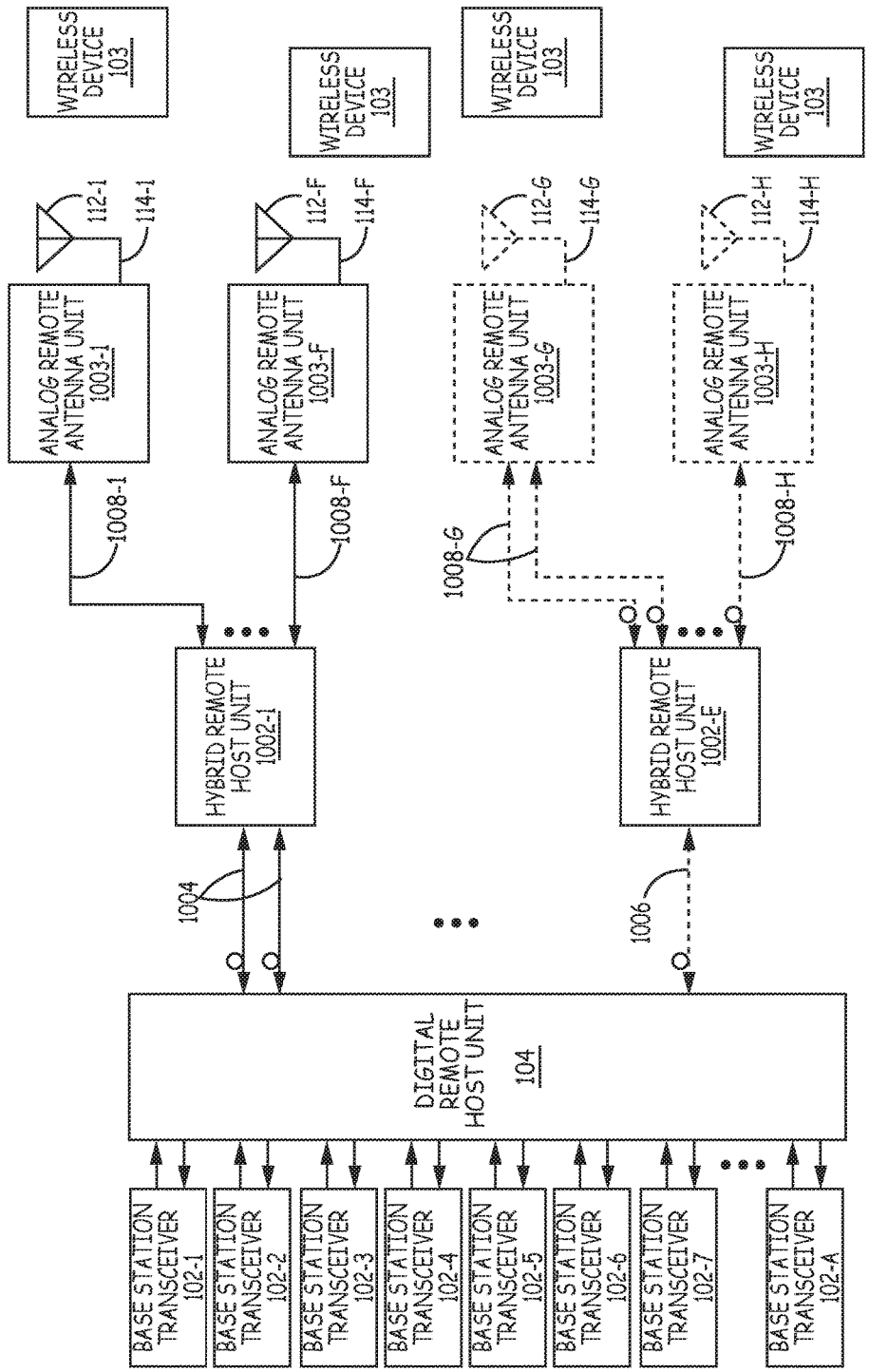
FIG. 10 is a block diagram of one exemplary embodiment of a hybrid distributed antenna system.
Figure 11:
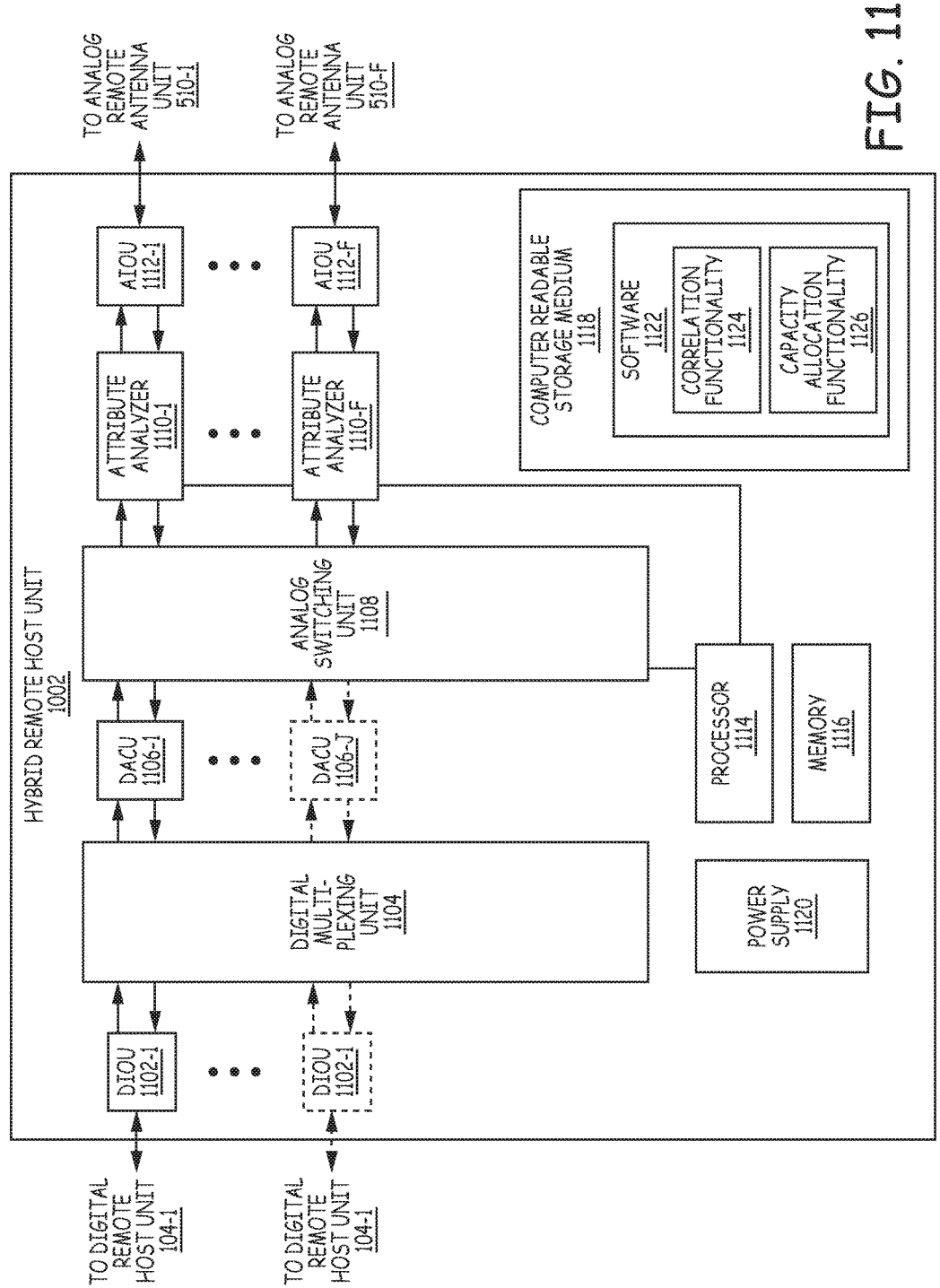
FIG. 11 is a block diagram of a hybrid remote host unit shown in FIG. 10.
Figure 13:
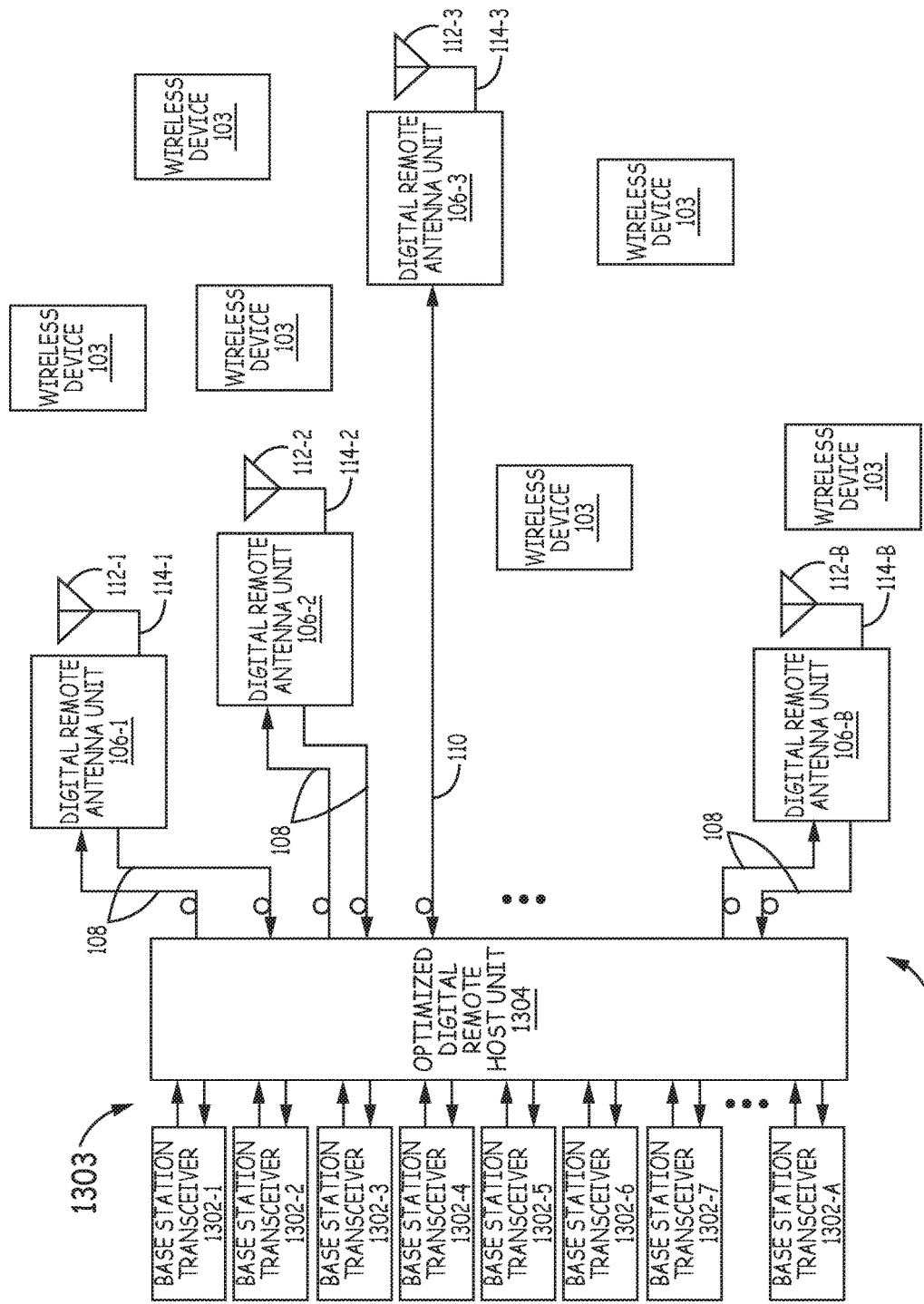
FIG. 13 is a block diagram of one exemplary embodiment of an optimized digital distributed antenna system.
Figure 14:
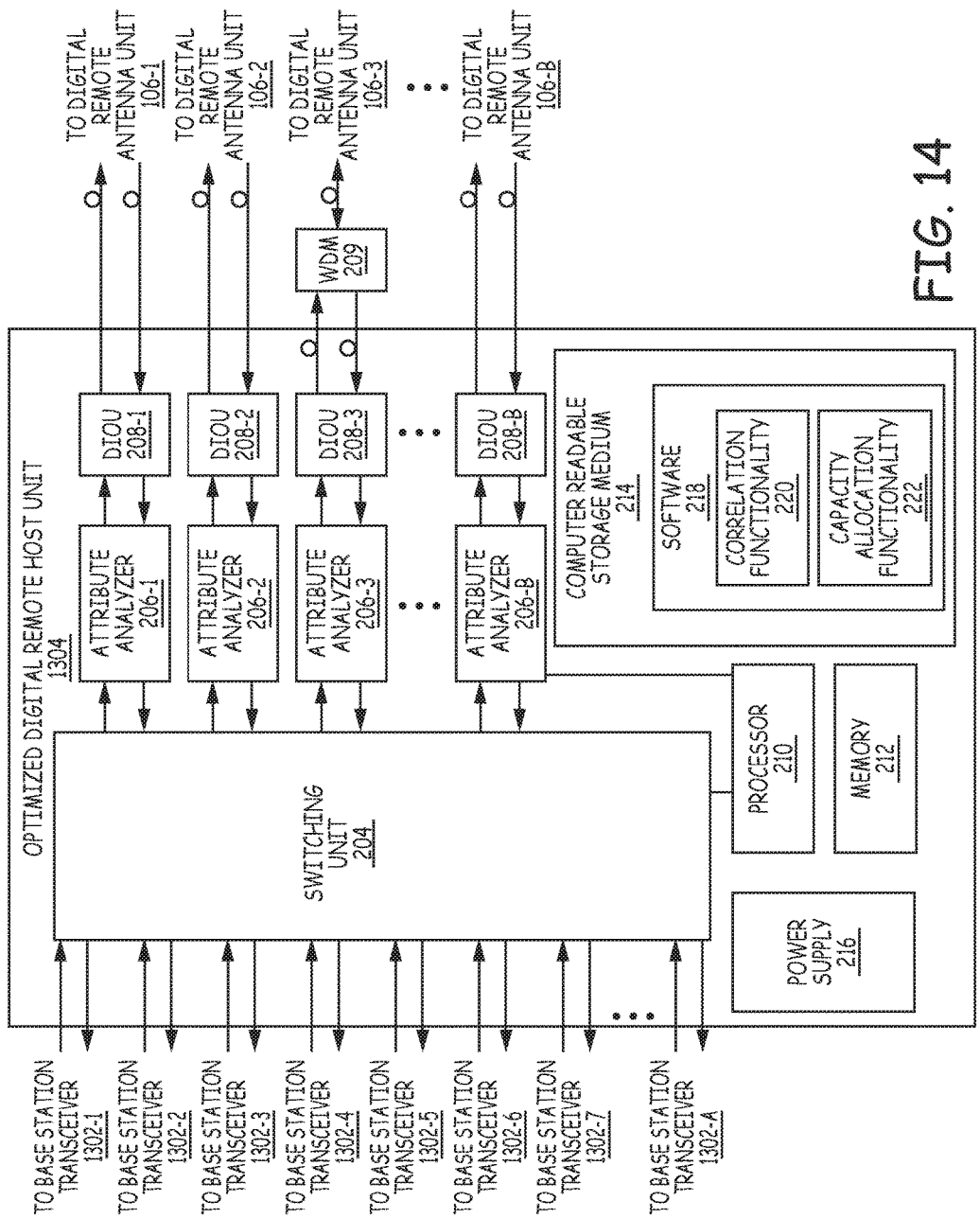
FIG. 14 is a block diagram of an exemplary embodiment of the optimized digital remote host unit shown in FIG. 13.
Figure 15:
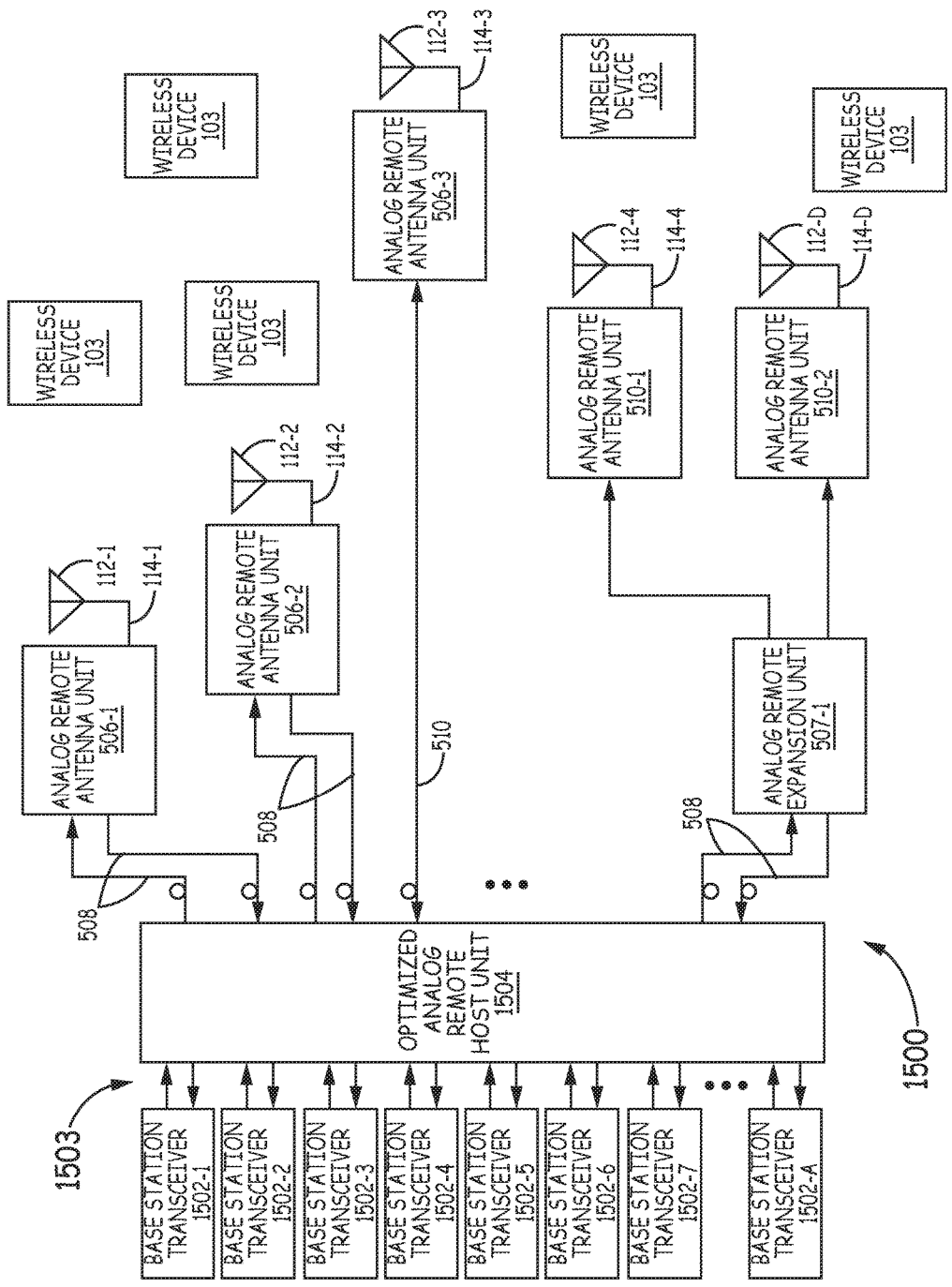
FIG. 15 is a block diagram of one exemplary embodiment of an optimized analog distributed antenna system.
Figure 16:
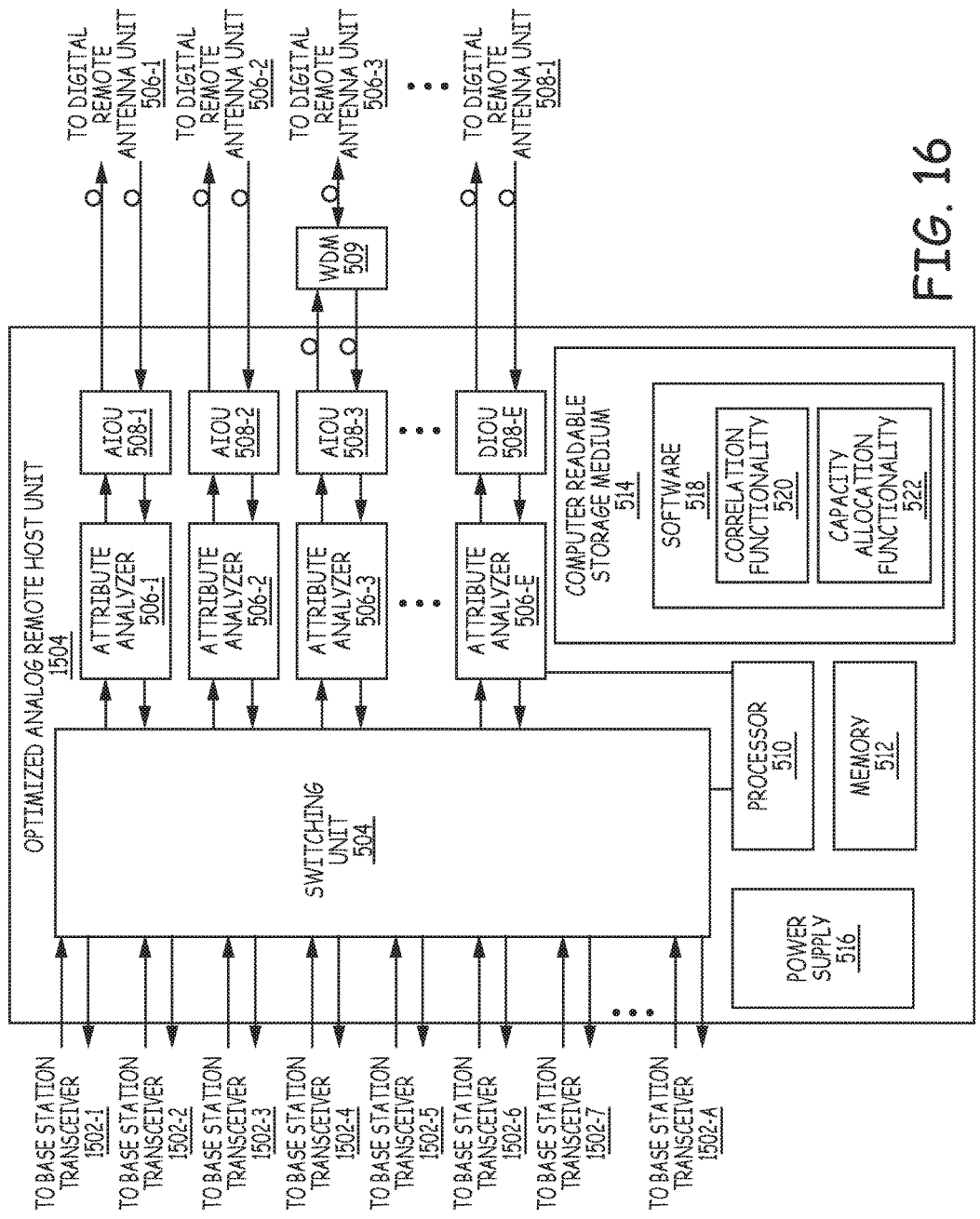
FIG. 16 is a block diagram of one exemplary embodiment of an optimized analog remote host unit shown in FIG. 15.
Figure 18:
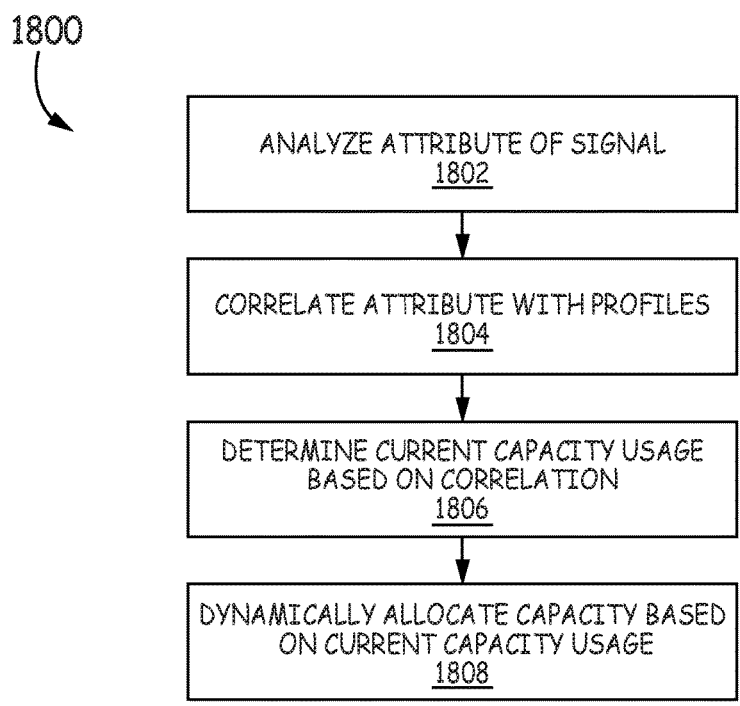

FIG. 18 is a flow diagram illustrating one exemplary embodiment of a method of dynamically allocating capacity at the digital remote host unit of FIGS. 1-2, the analog remote host unit of FIGS. 5-6, the analog remote expansion unit of FIGS. 5 and 8, the hybrid remote host unit of FIGS. 10-11, the optimized digital remote host unit of FIGS. 13-14, and the optimized analog remote host unit of FIGS. 15-16.

Like reference numbers and designations in the various drawings indicate like elements.

DETAILED DESCRIPTION

FIG. 1 is a block diagram of one exemplary embodiment of a digital distributed antenna system (DAS) 100 in which dynamic capacity allocation and power adjustment techniques described here can be implemented. Although the dynamic capacity allocation and power adjustment techniques described here are described in connection with a digital DAS 100 shown in FIG. 1, it is to be understood that the dynamic capacity allocation and power adjustment techniques described here can be used in other DAS, repeater, or distributed base station products and systems (for example, a "pure" analog DAS, an optimized-BTS DAS as described below, or a hybrid digital-analog DAS).

The digital DAS 100 is used to distribute bi-directional wireless communications between one or more base station transceivers 102 (for example, base station transceivers 102-1 through 102-A) and one or more wireless devices 103 (such as mobile wireless devices such as mobile telephones, mobile computers, and/or combinations thereof such as personal digital assistants (PDAs) and smartphones). In the exemplary embodiment shown in FIG. 1, the digital DAS 100 is used to distribute a plurality of bi-directional radio frequency (RF) bands. Each radio frequency band is typically used to communicate multiple logical bi-directional RF channels.

The techniques described here are especially useful in connection with the distribution of wireless communications that use licensed radio frequency spectrum, such as cellular radio frequency communications. Examples of such cellular RF communications include cellular communications that support one or more of the second generation, third generation, and fourth generation Global System for Mobile communication (GSM) family of telephony and data specifications and standards, one or more of the second generation, third generation, and fourth generation Code Division Multiple Access (CDMA) family of telephony and data specifications and standards, and/or the WiMAX family of specification and standards. In the particular exemplary embodiment described here in connection with FIG. 1, the digital DAS 100 is configured to handle eight cellular bi-directional radio frequency bands. In other embodiments, the digital DAS 100 is configured to handle greater or fewer cellular bi-directional radio frequency bands. In some implementations, the digital DAS 100 is configured to handle time division duplexed signals, which is used, for example, in some WiMAX implementations. In some implementations, the digital DAS 100 is configured to handle two-way communication on the same frequency using a switched input/output.

In other embodiments, the digital DAS 100 and the dynamic capacity allocation and power adjustment techniques described here are also used with wireless communications that support one or more of the IEEE 802.11 family of standards.

In the particular exemplary embodiment described here in connection with FIG. 1, the digital DAS 100 is configured to distribute wireless communications that use frequency division duplexing to implement logical bi-directional RF channels. In other embodiments, the digital DAS 100 is configured to communicate at least some wireless communications that use other duplexing techniques (such as time division duplexing, which is used, for example, in some WiMAX implementations).

Each of the bi-directional radio frequency bands distributed by the digital DAS 100 includes a separate radio frequency band for each of two directions of communications. One direction of communication goes from the base station transceivers 102 to the wireless device 103 and is referred to here as the "downstream" or downlink" direction. The other direction of communication goes from the wireless device 103 to the base station transceivers 102 and is referred to here as the "upstream" or "uplink" direction. Each of the distributed bi-directional radio frequency bands includes a "downstream" band in which downstream RF channels are communicated for that bidirectional radio frequency band and an "upstream" band in which upstream RF channels are communicated for that bidirectional radio frequency band.

In the particular exemplary embodiment shown in FIG. 1, the digital DAS 100 comprises a digital remote host unit 104 and one or more digital remote antenna units (DRUs) 106 (for example, digital remote antenna units 106-1 through 106-B). The digital remote host unit 104 is communicatively coupled to the one or more base station transceivers 102 either directly (for example, via one or more coaxial cable connections) or indirectly (for example, via one or more donor antennas and one or more bidirectional amplifiers). In the particular exemplary embodiment shown in FIG. 1, the digital remote host unit 104 communicates radio frequency (RF) signals with the one or more base station transceivers 102.

In the particular exemplary embodiment shown in FIG. 1, the digital remote host unit 104 can be communicatively coupled to up to thirty-two digital remote antenna units 106. The eight bi-directional radio frequency bands supported by the digital DAS 100 can be dynamically allocated amongst the thirty-two digital remote antenna units 106 in various ways as further described below. In other embodiments, the digital remote host unit 104 can be communicatively coupled to greater or fewer quantities of digital remote antenna units 106. The relationship between the quantity of radio frequency bands supported by the digital DAS 100 to the quantity of digital remote antenna units 106 communicatively coupled to the digital remote host unit 104 varies in different embodiments.

In the particular exemplary embodiment shown in FIG. 1, the digital remote host unit 104 communicates digitized transport signals with the digital remote antenna units 106. These digitized transport signals are digitized intermediate frequency signals. For purposes of this description, the terms "intermediate frequency" and "intermediate frequencies" encompasses frequencies that are not either baseband frequencies or radio frequencies. In additional embodiments described below, the transport signals are analog intermediate frequency transport signals.

In the particular exemplary embodiment shown in FIG. 1, the digital remote host unit 104 is communicatively coupled to some digital remote antenna units 106 (for example, digital remote antenna units 106-1, 106-2, and 106-B) using an optical fiber pair 108 and connected to other digital remote antenna units 106 using a single optical fiber 110 (for example, digital remote antenna unit 106-3). At least a subset of the eight bi-directional frequency bands can be communicated between the digital remote host unit 104 and the digital remote antenna units 106 using the optical fiber pair 108 or the single optical fiber 110 when capacity is allocated to the digital remote antenna units 106. While optical fiber pairs 108 and single optical fibers 110 are described in the exemplary embodiment show in FIG. 1, in other embodiments other types of digital media are used, such as at least one coaxial cable, at least one twisted pair, or wireless media.

In exemplary embodiments, the number of fiber pairs that are used depends on factors such as the bandwidth requirements for all frequencies. In the particular exemplary embodiments shown in FIG. 1, some digital remote antenna units 106 are connected with an optical fiber pair 108 (such as digital remote antenna units 106-1, 106-2, and 106-B) while other digital remote antenna units 106 are connected with a single optical fiber 110 (such as digital remote antenna unit 106-3). In some implementations of the particular exemplary embodiment shown in FIG. 1, one fiber of each optical fiber pair 108 is used to communicate downstream data from the digital remote host unit 104 to the digital remote antenna units 106 (and is also referred to here as the "downstream" fiber 108), and the other fiber of each optical fiber pair 108 is used to communicate upstream data from the digital remote antenna units 106 to the digital remote host unit 104 (and is also referred to here as the "upstream" fiber 108). In some implementations, both the fiber used for downlink communication and the fiber used for uplink communication communicate more than one radio frequency band. In some implementations of the particular exemplary embodiment shown in FIG. 1 (such as digital remote antenna unit 106-3), the single optical fiber 110 is used to communicate both downlink communication and uplink communication. In these implementations, the downlink and uplink communication are multiplexed onto the single optical fiber 110 (for example, by using a wavelength division multiplexer described below).

Each digital remote antenna unit 106 is communicatively coupled to a respective antenna 112 (for example, antennas 112-1 through 112-B) over a respective coaxial cable 114 (such as a 50 Ohm coaxial cable).

A block diagram of an exemplary embodiment of the digital remote host unit 104 is shown in FIG. 2. In the particular embodiment shown in FIG. 2, the digital remote host unit 104 includes at least one digital-analog conversion unit (DACU) 202 (such as DACU 202-1 through DACU 202-A), at least one switching unit 204, at least one attribute analyzer 206 (such as attribute analyzer 206-1 through 206-B), at least one digital input/output unit (DIOU) 208 (such as DIOU 208-1 through 208-B), at least one processor 210, at least one memory 212, at least one computer readable storage medium 214, and at least one power supply 216.

Each DACU 202 is coupled to a base station transceiver 102 and receives downstream radio frequency signals from a bi-directional radio frequency band associated with the corresponding base station transceiver 102. While DACUs 202 are used in the implementation shown in FIG. 2 to interface with the base station transceivers, other base station transceiver interfaces may be used as well. Each DACU 202 optionally band-pass filters the relevant downstream radio frequency band, then down-converts the radio frequency band to an intermediate frequency version of the downstream radio frequency band, and subsequently digitizes the resulting intermediate frequency version. In other words, each DACU 202 generates digital samples for the respective downstream frequency band associated with a corresponding base station transceiver 102. In some embodiments, each DACU 202 directly digitizes the downstream radio frequency band for each bi-directional radio frequency band without first down-converting to an intermediate frequency. In other embodiments, some DACUs 202 first down-convert into an intermediate frequency and others directly digitizes without first down-converting.

In the upstream, each DACU 202 converts the digitized samples of each bi-directional radio frequency band into an intermediate frequency and then up-converts to radio frequency signals for transmission to the corresponding base station transceiver 102. In some embodiments, each DACU 202 directly converts the digitized samples of each bi-directional radio frequency band into the radio frequency signals without first converting to an intermediate frequency.

In other words, each DACU 202 operates to convert between at least one band of analog spectrum and N-bit words of digitized spectrum. In some embodiments, each DACU 202 is implemented with a Digital/Analog Radio Transceiver (DART board) commercially available from ADC Telecommunications, Inc. of Eden Prairie, Minn. as part of the FlexWave™ Prism line of products. The DART board is also described in U.S. patent application Ser. No. 11/627,251, assigned to ADC Telecommunications, Inc., published in U.S. Patent Application Publication No. 2008/01101482, and incorporated herein by reference.

Switching unit 204 receives the digital samples for each radio frequency band from each DACU 202 and routes the downstream digital samples down paths based on the desired allocation of the radio frequency bands. In exemplary embodiments, switching unit 204 sends a power level signal based on the desired power level of the signals radiating to the wireless devices 103 from various digital remote antenna units 106 in the digital DAS 100. This enables the digital DAS 100 to change the density of the system by adjusting the power level at various digital remote antenna units 106.

In some embodiments, switching unit 204 multiplexes the digital samples for multiple radio frequency bands onto the same path. In some embodiments, switching unit 204 simulcasts digital samples for a single radio frequency band down multiple paths. In the upstream, switching unit 204 receives digital samples from various digital remote antenna units 106 and routes them to their corresponding base station transceiver 102 through a corresponding DACU 202. In some embodiments, switching unit 204 demultiplexes the digital samples for multiple radio frequency bands received from the same path and routes them to their proper base station transceivers. In some embodiments, switching unit 204 aggregates uplink signals associated with a downlink simulcast signal and routes the aggregate uplink signal to its corresponding base station transceiver 102.

Switching unit 204 is communicatively coupled to the processor 210 and receives commands from the processor 210 to change the allocation and/or power level of radio frequency bands throughout the digital DAS 100. In some embodiments, switching unit 204 is implemented with a Serialized RF (SeRF board) commercially available from ADC Telecommunications, Inc. of Eden Prairie, Minn. as part of the FlexWave™ Prism line of products. The SeRF board is also described in U.S. patent application Ser. No. 11/627,251, assigned to ADC Telecommunications, Inc., published in U.S. Patent Application Publication No. 2008/0181282, and incorporated herein by reference.

Attribute analyzers 206 identify and analyze at least one attribute associated with either (or both) of the downlink digital samples or the uplink digital samples being sent to and from the digital remote antenna units 106. Each attribute analyzer is communicatively coupled to the processor 210. In some implementations of the embodiment shown in FIG. 2, the attributes relate to the upstream signals received at the digital remote host unit 104 from at least one digital remote antenna units 106. In some implementations of the embodiment shown in FIG. 2, the attributes relate to the downstream signals sent from the digital remote host unit 104 to the at least one digital remote antenna unit 106. In some implementations of the embodiment shown in FIG. 2, the attributes relate to both upstream and downstream signals communicated between the digital remote host unit 104 and the digital remote antenna unit 106.

In some implementations of the embodiment shown in FIG. 2, the attribute is the power level or power density of the upstream signal received at the attribute analyzer 206 of the digital remote host unit 104 from a digital remote antenna unit 106. The attribute analyzers 206 in this implementation include power density analyzers that determine the power density of the upstream signal. In other implementations the attribute analyzers 206 are power density analyzers that determine the power density of the downstream signal or both the upstream and downstream signals. The analyzed data about the power density in either the downlink or the uplink (or both) is sent to the processor 210 for further processing.

In some implementations of the embodiment shown in FIG. 2, the attribute is an uplink and/or downlink composite power, an uplink and/or downlink Receive Signal Strength Indicator (RSSI), an uplink and/or downlink Reference Signal Received Power (RSRP), an uplink and/or downlink Common Pilot Channel (CPICH), an uplink and/or downlink Signal to Interference & Noise Ratio (SINR), an uplink and/or downlink Reference Signal Received Quality (RSRQ), an uplink and/or downlink envelope power, signal integrity, closeness of subscribers to remote antenna units, and/or other uplink and/or downlink indicators related to traffic loading. In exemplary implementations, a Carrier Receive Signal Strength Indicator (Carrier RSSI) measures an average total receiver power observed in OFDM symbols containing reference symbols and is used as the attribute. In exemplary implementations, a RSRP or CPICH measures the average receive power over resource elements that carry specific signals. The RSRP or CPICH attribute is used to rank between different cells and input for handover and cell reselection processes such that when the power is too low, the RSRP or CPICH attribute can be used to re-allocate to other carriers.

In some implementations of the embodiment shown in FIG. 2, the attribute is a received envelope power. When the received envelope power is high, more subscribers can be allocated to a particular remote antenna unit. In some implementations, the attribute is an average of the entire composite power envelope or an actual power level from a baseline. In some implementations, the received envelope power is compared to the amount of information that the subscriber is getting. In some implementations of the embodiments shown in FIG. 2, the upstream signal reports that the downstream signal is weak and the attribute analyzer can use that information to reallocate subscribers to different remote antenna units, cells, or other resources. In exemplary embodiments, this decision is a predetermined action based upon a given value preset by the operator.

Each digital input/output unit (DIOU) 208 is an optical/electronic interface between the electronic signals used on the digital remote host unit 104 and the optical signals communicated across optical fiber pairs 108 and/or single optical fibers 110 to the digital remote antenna units 106. Each DIOU 208 converts between electrical and optical signals in the downlink and converts between optical and electrical signals in the uplink. A wavelength division multiplexer (WDM) 209 is used to multiplex both the downlink and uplink optical signals onto a single fiber when only a single optical fiber 110 is used to couple the digital remote host unit 104 with a digital remote antenna unit 106 (such as digital remote antenna unit 106-3 shown in FIG. 1).

The processor 210 is communicatively coupled to the switching unit 204 and each attribute analyzer 206 to implement dynamic capacity allocation and/or power level adjustment. The processor 210 is implemented using a suitable programmable processor (such as a microprocessor or a microcontroller) that executes software 218 stored on the computer readable storage medium 214 or in another place, such as a remote cloud based storage location. The software 218 implements at least some of the functionality described here as being implemented by the digital remote host unit 104, including the dynamic capacity allocation and power level adjustment. The software 218 comprises program instructions that are stored (or otherwise embodied) on an appropriate computer readable storage medium or media 214 (such as flash or other non-volatile memory, magnetic disc drives, and/or optical disc drives). At least a portion of the program instructions are read from the computer readable storage medium 214 by the programmable processor for execution thereby. The computer readable storage medium 214 on or in which the program instructions are embodied is also referred to here as a "program-product". Although the computer readable storage media 214 is shown in FIG. 2 as being included in, and local to, the digital remote host unit 104, it is to be understood that remote storage media (for example, storage media that is accessible over a network or communication link) and/or removable media can also be used. The digital remote host unit 104 also includes memory 212 for storing the program instructions (and any related data) during execution by the programmable processor. Memory 212 comprises, in one implementation, any suitable form of random access memory (RAM) now known or later developed, such as dynamic random access memory (DRAM). In other embodiments, other types of memory are used.

Software 218 includes correlation functionality 220 and capacity allocation functionality 222. Correlation functionality 220 correlates analyzed attribute data received from each attribute analyzer 206 with a plurality of profiles associated with different usage patterns for digital remote antenna units 106 in digital DAS 100. The correlation functionality 220 determines how the analyzed attribute data received from a particular attribute analyzer correlates to a particular profile. The closer the match between the analyzed attribute data and the profile, the higher the correlation. In some implementations of the embodiment shown in FIG. 2, the correlation functionality 220 generates a set of correlation probabilities for each of the profiles which is later used to make decisions regarding capacity allocation and/or power levels at the various units.

For example, correlation functionality 220 could determine that there is a high correlation between the analyzed attribute data received from attribute analyzer 206-1 and a profile indicating high usage. In contrast, correlation functionality 220 could determine that there is a low correlation between the analyzed attribute data received from attribute analyzer 206-2 and the profile indicating high usage. Instead, correlation functionality 220 could determine that there is a high correlation between the analyzed attribute data received from attribute analyzer 206-2 and the profile indicating low or no usage. In some implementations of the embodiment shown in FIG. 2, the correlation functionality 220 is initially setup by generating profiles for attributes based on known configurations having various attributes. In other words, the system would be configured into a specific usage scenario and a baseline profile for that scenario would be generated for subsequent correlation.

Once correlation functionality 220 has performed correlations between analyzed attribute data received from each attribute analyzer 206 and the plurality of profiles, capacity allocation functionality 222 analyzes the correlations to determine the current usage amongst the digital remote antenna units 106 in digital DAS 100. In some implementations of the embodiment shown in FIG. 2 where the attribute is the power density of the upstream signals, one power density profile will correlate best to the currently received upstream signals. The power density profile that correlates best to the currently received upstream signals corresponds to the current capacity utilization for the corresponding digital remote antenna unit 106. In other embodiments, correlation functionality 220 is simplified into an averaging functionality to average attribute data from each attribute analyzer 206 and compare the averages of each attribute analyzer 206.

In some implementations, the capacity allocation functionality determines the current usage amongst the digital remote antenna units 106 as a percentage of the capacity currently allocated to each digital remote antenna units 106 (for example, digital remote antenna unit 106-1 may be using 100% of the capacity currently allocated to it, while digital remote antenna unit 106-2 is only using 20% of the capacity currently allocated to it).

Capacity allocation functionality 222 then dynamically allocates capacity to the digital remote antenna units 106 that need additional capacity by shifting capacity from the digital remote antenna units 106 that are currently utilizing a lower percentage of their currently allocated capacity. Capacity allocation functionality 222 instructs switching unit 204 to allocate the capacity accordingly and switching unit 204 routes additional base station transceivers 102 to digital remote antenna units 106 that currently require additional capacity. Thus, more capacity is dynamically allocated to digital remote antenna units 106 that have higher current capacity usage while less capacity is dynamically allocated to digital remote antenna units 106 that have a lower current capacity usage.

In exemplary embodiments, capacity allocation functionality 222 also adjusts the power level at the digital remote antenna units 106 to better allocate capacity such as by shifting capacity from and/or lowering power levels of the digital remote antenna units 106 that are currently utilizing a lower percentage of their currently allocated capacity. The power level adjustment can be included as a power level indication sent to switching unit 204 and embedded in the signals sent to the digital remote antenna units 106 where they will be used to adjust the power of the radio frequency signals radiated at the digital remote antenna units 106.

Switching unit 204 switches the connections between the base station transceivers 102 and the various optical fiber pairs 108 and single optical fibers 110. For each downstream optical fiber 108 (and the downstream channel of each single optical fiber 110), the digital remote host unit 104 frames together digital samples for one or more downstream frequency bands (along with overhead data such as, for example, synchronization data and gain control data) and communicates the resulting frames to at least some of the digital remote antenna units 106 over that downstream optical fiber 108 (and the downstream channel of each single optical fiber 110). In some embodiments, additional switches are also positioned within other components of the digital DAS 100, such as the digital remote antenna units 106, so that additional levels of dynamic allocation and/or power level adjustment can occur at various levels. In exemplary embodiments where power level adjustments are provided to the digital remote antenna units 106, the switching unit 204 embeds the power level adjustment into the signals sent to the digital remote antenna units 106 where they will be used to adjust the power of the radio frequency signals radiated at the digital remote antenna units 106. In other embodiments, the power level adjustment is applied directly to the digital signals sent to the digital remote antenna units 106 before the digital signals are sent to the digital remote antenna units.

Figure 3A:
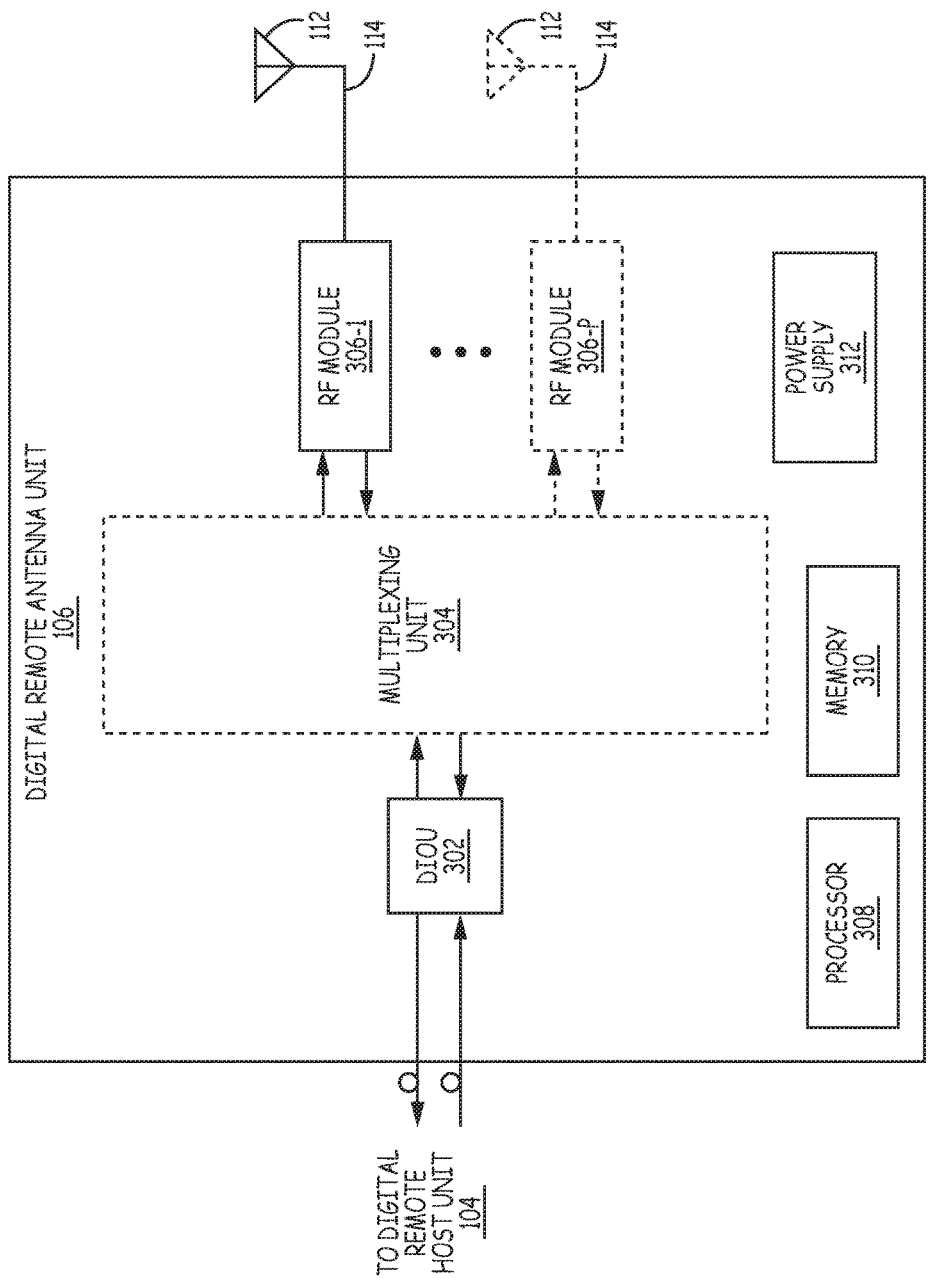
FIG. 3A is a block diagram of an exemplary embodiment of one of the digital remote antenna units shown in FIG. 1.
Figure 3B:
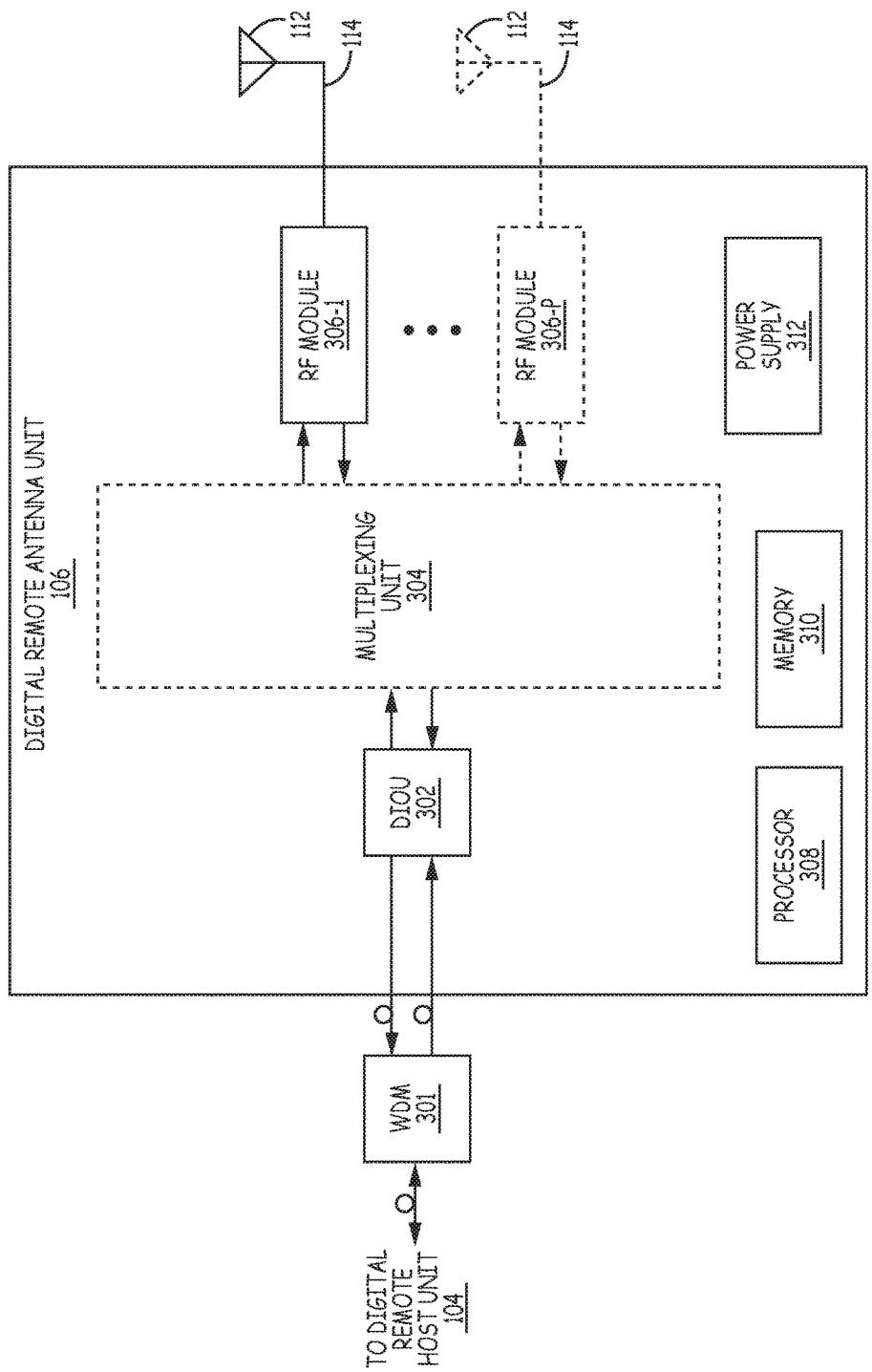
FIG. 3B is a block diagram of another exemplary embodiment of one of the digital remote antenna units shown in FIG. 1.

Block diagrams of an exemplary embodiment of digital remote antenna units 106 are shown in FIG. 3A and FIG. 3B. While the digital remote antenna unit 106 itself is the same in the embodiments shown in FIG. 3A and FIG. 3B, the implementation shown in FIG. 3A is coupled to an optical fiber pair 108 (including one downstream fiber and one upstream fiber) and the implementation shown in FIG. 3B is coupled to a single optical fiber 110 through a wavelength division multiplexer (WDM) 301 that multiplexes both the downlink and the uplink signals onto the single optical fiber 110.

Both embodiments of digital remote antenna unit 106 shown in FIG. 3A and FIG. 3B include a digital input/output unit 302, an optional multiplexing unit 304, at least one RF module 306 (for example, RF module 306-1 or optional RF module 306-C), a processor 308, memory 310, and a power supply 312. The digital input/output unit (DIOU) 302 receives the downstream frames from a downstream optical fiber 108/110 and converts the optical signals into electrical signals that are passed to the multiplexing unit 304. The DIOU 302 also receives the upstream signals from the multiplexing unit 304 and converts the electrical signals into optical signals that are output to an upstream optical fiber 108/110.

In implementations where multiple bi-directional frequency bands corresponding to multiple base station transceivers 102 have been multiplexed together at the digital remote host unit 104 and sent to the digital remote antenna unit 106, the optional multiplexing unit 304 receives the aggregate electric signal in the downstream and demultiplexes the signals representing each bi-directional frequency band and routes the signals corresponding to each bi-directional frequency band to a different RF module 306 (for example, signals corresponding to a first bi-directional frequency band would be routed to RF module 306-1 while signals corresponding to a second bi-directional frequency band would be routed to RF module 306-2). In implementations where only a single bi-directional frequency band is communicated to and from the digital remote host unit 104, optional multiplexing unit 304 is not necessary and DIOU 302 is communicatively coupled directly to RF module 306-1.

Figure 4A:
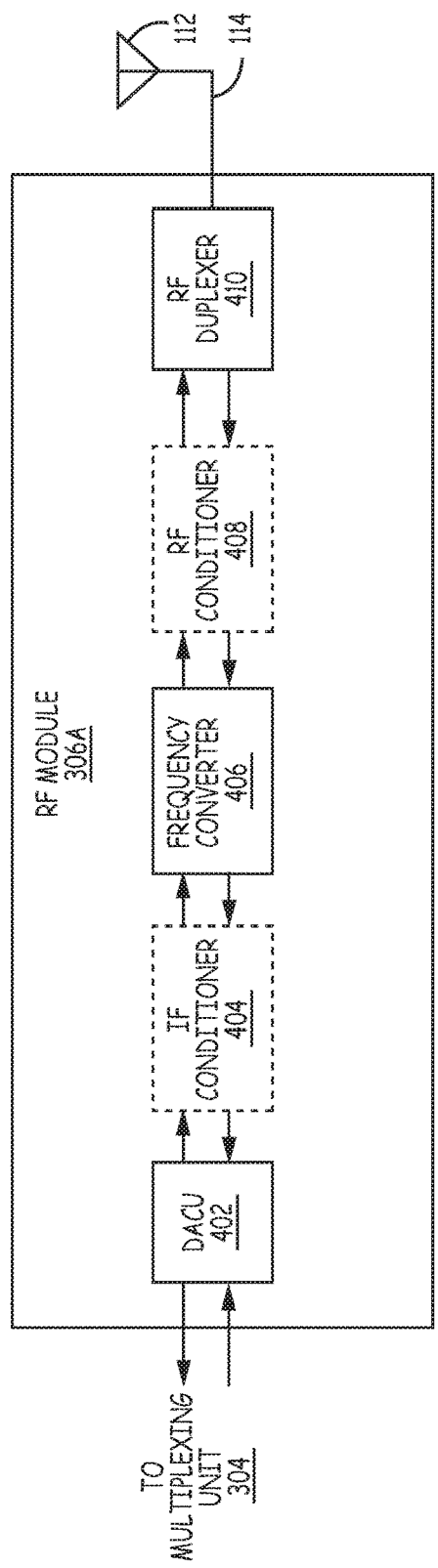
FIG. 4A is a block diagram of an exemplary embodiment of one of the RF modules shown in FIGS. 3A-3B.
Figure 4B:
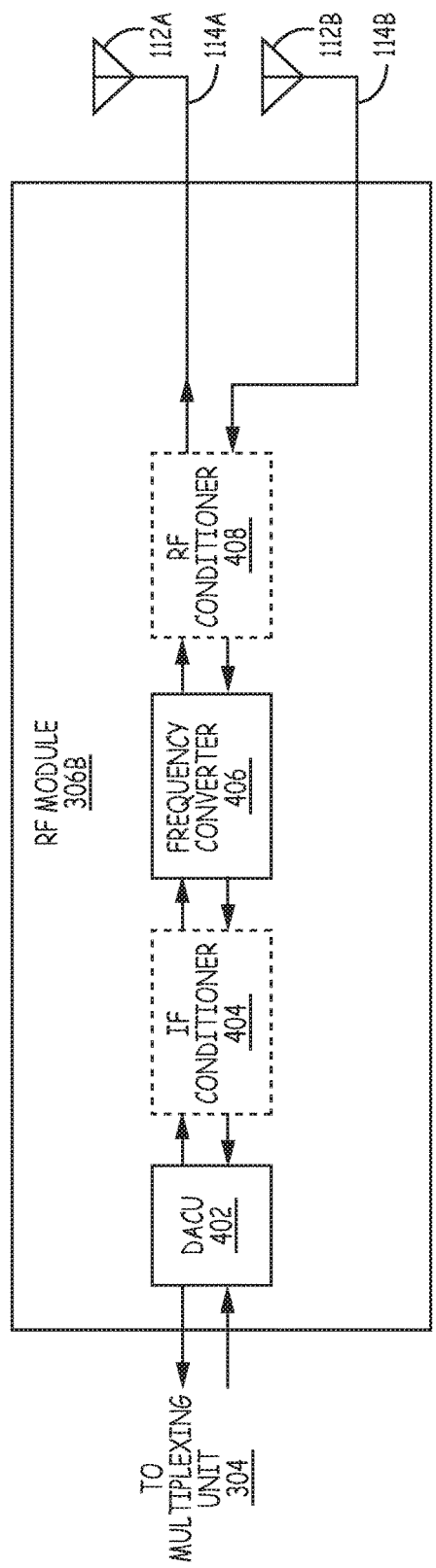
FIG. 4B is a block diagram of another exemplary embodiment of one of the RF modules shown in FIGS. 3A-3B.
Figure 4C:
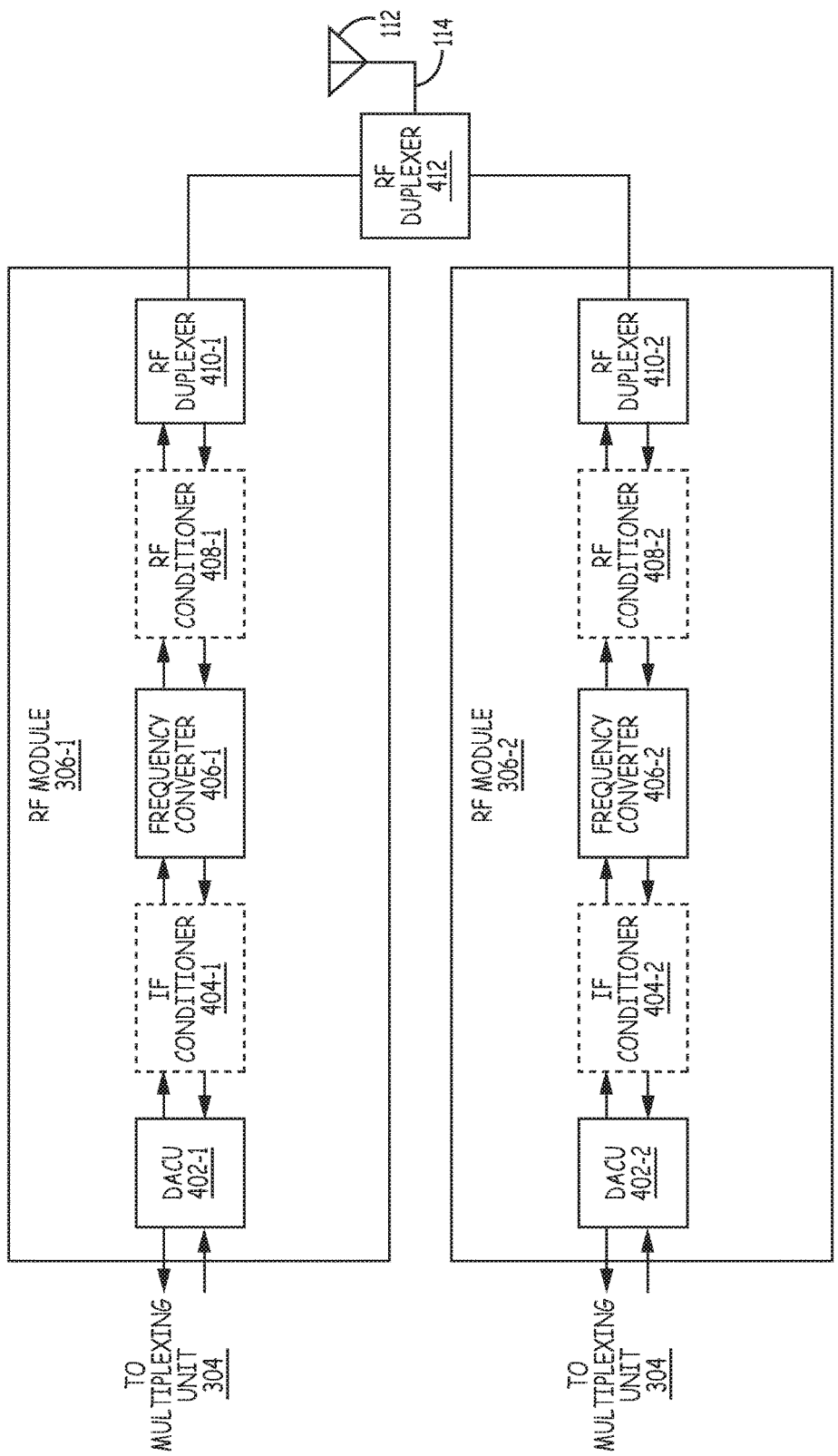
FIG. 4C is a block diagram of an exemplary embodiment of two RF modules shown in FIGS. 3A-3B sharing a single antenna.

Block diagrams of exemplary embodiments of RF module 306 are shown in FIG. 4A through FIG. 4C. A block diagram of an exemplary embodiment of RF module 306 is shown in FIG. 4A, labeled RF module 306A. The particular embodiment of RF module 306A shown in FIG. 4A includes a digital to analog conversion unit (DACU) 402, an IF conditioner 404, a frequency converter 406, an optional RF conditioner 408, and an RF duplexer 410. The DACU 402 is coupled to the optional multiplexing unit 304 or the DIOU 302 of the digital remote antenna unit 106. The IF conditioner 404 is communicatively coupled to the DACU 402. The frequency converter 406 is communicatively coupled to the IF conditioner 404. The optional RF conditioner 408 is communicatively coupled to the frequency converter 406. The RF duplexer 410 is communicatively coupled to the optional RF conditioner 408. The RF duplexer 410 is also communicatively coupled to an antenna 112 over a respective coaxial cable 114.

In the downstream, the DACU 402 receives downstream digital samples for the respective downstream frequency band and converts the digitizes samples into an intermediate frequency. The optional IF conditioner 404 conditions the intermediate frequency signal (for example, through amplification, attenuation, and filtering) before the frequency converter 406 frequency up-converts the intermediate frequency signal to radio frequency (RF). The optional RF conditioner 408 conditions the radio frequency signal (for example, through amplification, attenuation, and filtering) before the RF duplexer 410 duplexes the downlink RF signal with the uplink RF signal onto the same coaxial cable 114 for transmission/reception using the antenna 112.

In the upstream, the RF duplexer 410 splits the uplink RF signal received from the antenna 112 across the coaxial cable 114 from the downlink RF signal. The optional RF conditioner 408 conditions the uplink RF signal (for example, through amplification, attenuation, and filtering) before the frequency converter down-converts the RF signal to an intermediate frequency. The optional IF conditioner 404 conditions the intermediate frequency signal (for example, through amplification, attenuation, and filtering) before it is converted by the DACU 402 back to digital samples for transmission upstream to the multiplexing unit 304 or the DIOU 302 of the digital remote antenna unit 106.

A block diagram of another exemplary embodiment of RF module 306 is shown in FIG. 4B, labeled RF module 306B. The particular embodiment of RF module 306B shown in FIG. 4B is the same as RF module 306A shown in FIG. 4A, except for that instead of an RF duplexer it includes two separate antennas, one antenna 112A for the downlink RF signal coupled to the optional RF conditioner 408 through the coaxial cable 114A, and one antenna 112B for the uplink RF signal coupled to the optional RF conditioner 408 through the coaxial cable 114B.

A block diagram of an exemplary embodiment of two RF modules 306 is shown in FIG. 4C, labeled RF modules 306-1 and 306-2. The particular embodiments of RF modules 306-1 and 306-2 shown in FIG. 4C are the same as RF module 306A shown in FIG. 4A. In addition, the two RF modules 306-1 and 306-2 are coupled to a single antenna 112 through an RF diplexer 412. The RF diplexer diplexes the duplexed upstream and downstream signals for both RF module 306-1 and RF module 306-2 onto a single coaxial cable 114 for transmission and reception across a single antenna 112.

FIG. 5 is a block diagram of one exemplary embodiment of an analog distributed antenna system (DAS) 500 in which dynamic capacity allocation and/or power level adjustment techniques described here can be implemented. Although the dynamic capacity allocation and/or power level adjustment techniques described here are described in connection with an analog DAS 500 shown in FIG. 5, it is to be understood that the dynamic capacity allocation and/or power level adjustment techniques described here can be used in other DAS, repeater, or distributed base station products and systems (for example, a "pure" digital DAS, an optimized-BTS DAS, or a hybrid digital-analog DAS).

The analog DAS 500 is used to distribute bi-directional wireless communications between one or more base station transceivers 502 (for example, base station transceivers 502-1 through 502-A) and one or more wireless devices 103 (such as mobile wireless devices such as mobile telephones, mobile computers, and/or combinations thereof such as personal digital assistants (PDAs) and smartphones). In the exemplary embodiment shown in FIG. 5, the analog DAS 500 is used to distribute a plurality of bi-directional radio frequency (RF) bands. Each radio frequency band is typically used to communicate multiple logical bi-directional RF channels.

The techniques described here are especially useful in connection with the distribution of wireless communications that use licensed radio frequency spectrum, such as cellular radio frequency communications. Examples of such cellular RF communications include cellular communications that support one or more of the second generation, third generation, and fourth generation Global System for Mobile communication (GSM) family of telephony and data specifications and standards, one or more of the second generation, third generation, and fourth generation Code Division Multiple Access (CDMA) family of telephony and data specifications and standards, and/or the WiMAX family of specification and standards. In the particular exemplary embodiment described here in connection with FIG. 5, the analog DAS 500 is configured to handle eight cellular bi-directional radio frequency bands. In other embodiments, the analog DAS 500 is configured to handle greater or fewer cellular bi-directional radio frequency bands. In other embodiments, the analog DAS 500 and the dynamic capacity allocation and/or power level adjustment techniques described here are also used with wireless communications that support one or more of the IEEE 802.11 family of standards. In some implementations, the analog DAS 500 is configured to handle time division duplexed signals, which is used, for example, in some WiMAX implementations. In some implementations, the analog DAS 500 is configured to handle two-way communication on the same frequency using a s witched input/output.

In the particular exemplary embodiment described here in connection with FIG. 5, the analog DAS 500 is configured to distribute wireless communications that use frequency division duplexing to implement logical bi-directional RF channels. In other embodiments, the analog DAS 500 is configured to communicate at least some wireless communications that use other duplexing techniques (such as time division duplexing, which is used, for example, in some WiMAX implementations).

Each of the bi-directional radio frequency bands distributed by the analog DAS 500 includes a separate radio frequency band for each of two directions of communications. One direction of communication goes from the base station transceiver 502 to the wireless device 503 and is referred to here as the "downstream" or downlink" direction.

The other direction of communication goes from the wireless device 503 to the base station transceiver 502 and is referred to here as the "upstream" or "uplink" direction. Each of the distributed bi-directional radio frequency bands includes a "downstream" band in which downstream RF channels are communicated for that bidirectional radio frequency band and an "upstream" band in which upstream RF channels are communicated for that bidirectional radio frequency band.

In the particular exemplary embodiment shown in FIG. 5, the analog DAS 500 comprises an analog remote host unit 504 and one or more analog remote antenna units 506 (for example, analog remote antenna units 506-1 through 506-B). The analog remote host unit 504 is communicatively coupled to the one or more base station transceivers 502 either directly (for example, via one or more coaxial cable connections) or indirectly (for example, via one or more donor antennas and one or more bidirectional amplifiers).

In the particular exemplary embodiment shown in FIG. 5, the analog remote host unit 504 can be communicatively coupled to up to thirty-two analog remote antenna units 506. The eight bi-directional radio frequency bands supported by the analog DAS 500 can be dynamically allocated amongst the thirty-two analog remote antenna units 506 in various ways as further described below. In other embodiments, the analog remote host unit 504 can be communicatively coupled to greater or fewer quantities of analog remote antenna units 506. The relationship between the quantity of radio frequency bands supported by the analog DAS 500 to the quantity of analog remote antenna units 506 communicatively coupled to the analog remote host unit 504 varies in different embodiments.

In the particular exemplary embodiment shown in FIG. 5, the analog remote host unit 504 communicates analog transport signals with the analog remote antenna units 506. These analog transport signals are intermediate frequency signals. As indicated above, for purposes of this description, the terms "intermediate frequency" and "intermediate frequencies" encompasses frequencies that are not either baseband frequencies or radio frequencies. In other embodiments, the transport signals are can be either digital or analog intermediate frequency transport signals.

In the particular exemplary embodiment shown in FIG. 5, the analog remote host unit 504 is communicatively coupled to some analog remote antenna units 506 (for example, analog remote antenna units 506-1, 506-2, and 506-B) using an optical fiber pair 508 and connected to other analog remote antenna units 506 using a single optical fiber 510 (for example, analog remote antenna unit 506-3). At least a subset of the eight bi-directional frequency bands can be communicated between the analog remote host unit 504 and the analog remote antenna units 506 using the optical fiber pairs 508 or the single optical fiber 510 when capacity is allocated to the analog remote antenna units 506.

The number of fiber pairs that are used depends on factors such as the bandwidth requirements for all frequencies. In the particular exemplary embodiments shown in FIG. 5, some analog remote antenna units 506 are connected with an optical fiber pair 508 (such as analog remote antenna units 506-1, 506-2, and 506-B) while other analog remote antenna units 506 are connected with a single optical fiber 510 (such as analog remote antenna unit 506-3). In some implementations of the particular exemplary embodiment shown in FIG. 5, one fiber of each optical fiber pair 508 is used to communicate downstream data from the analog remote host unit 504 to the analog remote antenna units 506 (and is also referred to here as the "downstream" optical fiber 508), and the other fiber of each optical fiber pair 508 is used to communicate upstream data from the analog remote antenna units 506 to the analog remote host unit 504 (and is also referred to here as the "upstream" fiber 508). In some implementations, both the fiber used for downlink communication and the fiber used for uplink communication communicate more than one radio frequency band. In some implementations of the particular exemplary embodiment shown in FIG. 1 (such as analog remote antenna unit 506-3), the single optical fiber 510 is used to communicate both downlink communication and uplink communication. In these implementations, the downlink and uplink communication are multiplexed onto the single optical fiber 510 (for example, by using a wavelength division multiplexer described below).

In the particular exemplary embodiment shown in FIG. 5, the analog remote host unit 504 is communicatively coupled to an analog remote expansion unit 507 using an optical fiber pair 508. In the particular exemplary embodiment shown in FIG. 5, the analog remote expansion unit 507 is coupled to two analog remote antenna units 512 (analog remote antenna unit 512-1 and analog remote antenna unit 512-2) using a single coaxial cable 514 between each analog remote antenna unit 512 and the analog remote expansion unit 507. While single coaxial cables 514 are described in the exemplary embodiment show in FIG. 1, in other embodiments other types of digital media are used, such as at least one optical fiber, at least one twisted pair, or wireless media.

Each analog remote antenna unit 506 and 512 is communicatively coupled to a respective antenna 112 (for example, antennas 112-1 through 112-D) over a respective coaxial cable 114 (such as a 50 Ohm coaxial cable). While fiber optic cable is described as coupling the analog remote antenna units 506 to the analog remote host unit 504, it is understood that coaxial cable or other communication media may be used in other implementations.

A block diagram of an exemplary embodiment of the analog remote host unit 504 is shown in FIG. 6. In the particular embodiment shown in FIG. 6, the analog remote host unit 504 includes at least one IF converter 602 (such as IF converter 602-1 through 602-A), at least one switching unit 604, at least one attribute analyzer 606 (such as attribute analyzer 606-1 through 606-B), at least one analog input/output unit (AIOU) 608 (such as AIOU 608-1 through 608-B), at least one processor 610, at least one memory 612, at least one computer readable storage medium 614, and at least one power supply 616.

Each IF converter 602 is coupled to a base station transceiver 502 and receives downstream radio frequency signals from a bi-directional radio frequency band associated with the corresponding base station transceiver 502. While IF converters 602 are used in the implementation shown in FIG. 6 to interface with the base station transceivers, other base station transceiver interfaces may be used as well. Each IF converter 602 optionally band-pass filters the relevant downstream radio frequency band then down-converts the radio frequency band to an intermediate frequency version of the downstream radio frequency band. In other words, each IF converter 602 generates an intermediate frequency representation for the respective downstream frequency band associated with a corresponding base station transceiver 502. In the upstream, each IF converter 602 up-converts the intermediate frequency representation of each bi-directional radio frequency band to radio frequency signals for transmission to the corresponding base station transceiver 502. In other words, each IF converter 602 operates to convert between at least one band of analog spectrum and an intermediate frequency for transport through the analog DAS 500.

Switching unit 604 operates in a similar fashion to switching unit 204 described above, but instead of switching digital signals it switches analog intermediate frequency transport signals. Specifically, switching unit 604 receives the digital samples for each radio frequency band from each IF converter 602 and routes the downstream intermediate frequency signals down paths based on the desired allocation of the radio frequency bands. In some embodiments, switching unit 604 multiplexes the analog intermediate frequency transport signals for multiple radio frequency bands onto the same path. In some embodiments, switching unit 604 simulcasts analog intermediate frequency transport signals for a single radio frequency band down multiple paths. In the upstream, switching unit 604 receives digital samples from various analog remote antenna units 506 and/or analog remote expansion units 507 and routes them to their corresponding base station transceiver 502 through a corresponding IF conditioner 602. In some embodiments, switching unit 604 demultiplexes the analog intermediate frequency transport signals for multiple radio frequency bands received from the same path and routes them to their proper base station transceivers. In some embodiments, switching unit 604 aggregates uplink signals associated with a downlink simulcast signal and routes the aggregate uplink signal to its corresponding base station transceiver 502.

Switching unit 604 is communicatively coupled to the processor 610 and receives commands from the processor 610 to change the allocation and/or adjust the power level of radio frequency bands throughout the analog DAS 500. In some embodiments, switching unit 604 is implemented with a Serialized RF (SeRF board) commercially available from ADC Telecommunications, Inc. of Eden Prairie, Minn. as part of the FlexWave™ Prism line of products and described in the U.S. patent application referenced above.

Attribute analyzers 606 identify and analyze at least one attribute associated with either (or both) of the downlink analog intermediate frequency transport signals or the uplink analog intermediate frequency transport signals being sent to and from the analog remote antenna units 506 and the analog remote expansion units 507. Each attribute analyzer is communicatively coupled to the processor 610. In some implementations of the embodiment shown in FIG. 2, the attributes relate to upstream signals received at the analog remote host unit 504 from at least one analog remote antenna unit 506 and/or analog remote expansion unit 507. In some implementations of the embodiment shown in FIG. 6, the attributes relate to the downstream signals sent from the analog remote host unit 504 to the at least one analog remote antenna unit 506 and/or analog remote expansion unit 507. In some implementations of the embodiment shown in FIG. 6, the attributes relate to both upstream and downstream signals communicated between the analog remote host unit 504 and the analog remote antenna unit 506 and/or analog remote expansion unit 507.

In some implementations of the embodiment shown in FIG. 6, the attribute is the power level or power density of the upstream signal received at the attribute analyzer 606 of the analog remote host unit 504 from an analog remote antenna unit 506. The attribute analyzers 606 in this implementation include power density detectors that determine the power density of the upstream signal. In other implementations, the attribute analyzers 606 are power density analyzers that determine the power density of the downstream signal or both the upstream and downstream signals. The analyzed data about the power density in either the downlink or the uplink (or both) is sent to the processor 610 for further processing.

Each analog input/output unit (AIOU) 608 is an optical/electronic interface between the electronic signals used on the digital remote host unit 104 and the optical signals communicated across an optical fiber pair 508 and single optical fibers 510 to the analog remote antenna units 506 and/or analog remote expansion units 507. Each AIOU 608 converts between electrical and optical signals in the downlink and converts between optical and electrical signals in the uplink. A wavelength divisional multiplexer (WDM) 609 is used to multiplex both the downlink and uplink optical signals onto a single fiber when only a single optical fiber 510 is used to couple the analog remote host unit 504 with an analog remote antenna unit 506 (such as analog remote antenna unit 506-3 shown in FIG. 5) or an analog remote expansion unit 507.

The processor 610 is communicatively coupled to the switching unit 604 and each attribute analyzer 606 to implement dynamic capacity allocation and/or power level adjustment. The processor 610 is implemented using a suitable programmable processor (such as a microprocessor or a microcontroller) that executes software 618 stored on the computer readable storage medium 614. The software 618 implements at least some of the functionality described here as being implemented by the analog remote host unit 504, including the dynamic capacity allocation and/or power level adjustment. The software 618 comprises program instructions that are stored (or otherwise embodied) on an appropriate computer readable storage medium or media 614 (such as flash or other non-volatile memory, magnetic disc drives, and/or optical disc drives). At least a portion of the program instructions are read from the computer readable storage medium 614 by the programmable processor for execution thereby. The computer readable storage medium 614 on or in which the program instructions are embodied is also referred to here as a "program-product". Although the computer readable storage media 614 is shown in FIG. 6 as being included in, and local to, the analog remote host unit 504, it is to be understood that remote storage media (for example, storage media that is accessible over a network or communication link) and/or removable media can also be used. The analog remote host unit 504 also includes memory 612 for storing the program instructions (and any related data) during execution by the programmable processor. Memory 612 comprises, in one implementation, any suitable form of random access memory (RAM) now known or later developed, such as dynamic random access memory (DRAM). In other embodiments, other types of memory are used.

Software 618 includes correlation functionality 620 and capacity allocation functionality 622. Correlation functionality 620 correlates analyzed attribute data received from each attribute analyzer 606 with a plurality of profiles associated with different usage patterns for analog remote antenna units 506 in analog DAS 500. The correlation functionality 620 determines how the analyzed attribute data received from a particular attribute analyzer 606 correlates to a particular profile. The closer the match between the analyzed attribute data and the profile, the higher the correlation. In some implementations of the embodiment shown in FIG. 6, the correlation functionality 620 generates a set of correlation probabilities for each of the profiles.

For example, correlation functionality 620 could determine that there is a high correlation between the analyzed attribute data received from attribute analyzer 606-1 and a profile indicating high usage. In contrast, correlation functionality 620 could determine that there is a low correlation between the analyzed attribute data received from attribute analyzer 606-2 and the profile indicating high usage. Instead, correlation functionality 620 could determine that there is a high correlation between the analyzed attribute data received from the attribute analyzer 606-2 and the profile indicating low or no usage. In some implementations of the embodiment shown in FIG. 6, the correlation functionality 620 is initially setup by generating profiles for attributes based on known configurations having various attributes. In other words, the system would be configured into a specific usage scenario and a baseline profile for that scenario would be generated for subsequent correlation.

Once correlation functionality 620 has performed correlations between analyzed attribute data received from each attribute analyzer 606 and the plurality of profiles, capacity allocation functionality 622 analyzes the correlations to determine the current usage amongst the analog remote antenna units 506 in analog DAS 500. In some implementations of the embodiment shown in FIG. 6 where the attribute is the power density of the upstream signals, one power density profile will correlate best to the currently received upstream signals. The power density profile that correlates best to the currently received upstream signals corresponds to the current capacity utilization for the corresponding analog remote antenna unit 506.

In some implementations, the capacity allocation functionality determines the current usage amongst the analog remote antenna units 506 as a percentage of the capacity currently allocated to each analog remote antenna unit 506 (for example, analog remote antenna unit 506-1 may be using 100% of the capacity currently allocated to it, while analog remote antenna unit 506-2 is only using 20% of the capacity currently allocated to it).

Capacity allocation functionality 622 then dynamically allocates capacity to the analog remote antenna units 506 that need additional capacity by shifting capacity from the analog remote antenna units 506 that are currently utilizing a lower percentage of their currently allocated capacity. Capacity allocation functionality 622 instructs switching unit 604 to allocate the capacity accordingly and switching unit 604 routes additional base station transceivers 502 to analog remote antenna units 506 that currently require additional capacity. Thus, more capacity is dynamically allocated to analog remote antenna units 506 that have higher current capacity usage while less capacity is dynamically allocated to analog remote antenna units 506 that have a lower current capacity usage.

In exemplary embodiments, capacity allocation functionality 622 also adjusts the power level at the analog remote antenna units 506 to better allocate capacity such as by shifting capacity from and/or lowering power levels of the analog remote antenna units 506 that are currently utilizing a lower percentage of their currently allocated capacity. The power level adjustment can be included as a power level indication sent to switching unit 204 where it is either embedded in the analog signals sent to the analog remote antenna units 506 (such as through gain control data) or used to adjust the power of the analog signals sent to the analog remote antenna units 506.

Switching unit 604 switches the connections between the base station transceivers 502 and the various optical fiber pairs 508 and single optical fibers 510. For each downstream optical fiber 508 (and the downstream channel of each single optical fiber 510), the analog remote host unit 504 multiplexes the analog intermediate frequency signals for one or more downstream frequency bands (along with the overhead data such as, for example, synchronization data and gain control data) and communicates the resulting aggregate multiplexed signal to at least some of the analog remote antenna units 506 over the downstream optical fiber 508 (and the downstream channel of each single optical fiber 510). In exemplary embodiments implementing power level adjustment, the switching unit 204 can either embed the power level adjustment into the analog signals sent to the analog remote antenna units 506 (such as through gain control data) or can be used to adjust the power of the analog signals sent to the analog remote antenna units 506 directly resulting in and adjustment of the associated radio frequency signal after radio frequency conversion and amplification. In some embodiments, additional switches are also positioned within other components of the analog DAS 500, such as the analog remote antenna units 506 and/or the analog remote expansion units 507, so that additional levels of dynamic allocation and/or power level adjustment can occur at various levels.

Figure 7A:
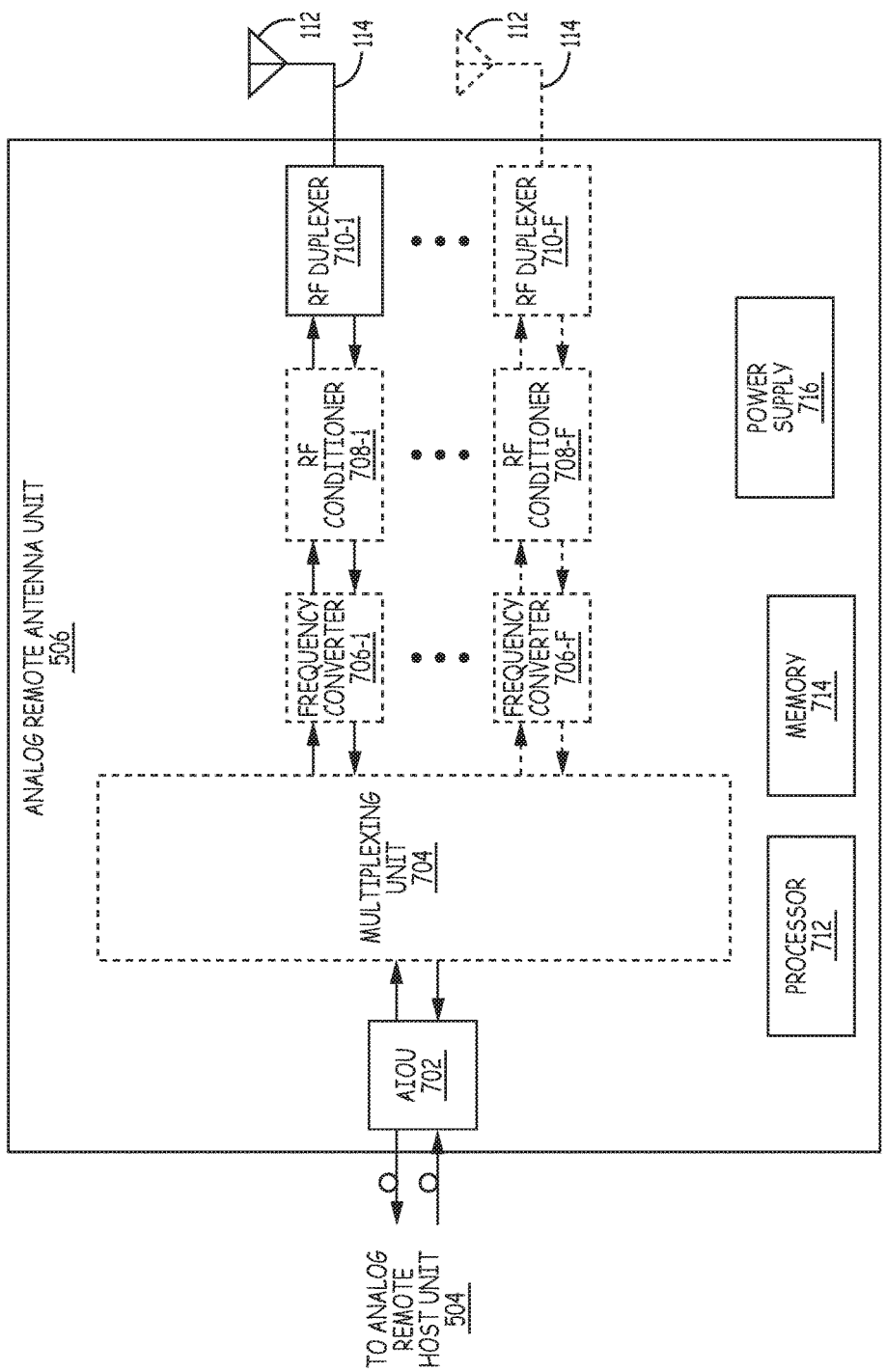
FIG. 7A is a block diagram of an exemplary embodiment of one of the analog remote antenna units shown in FIG. 5.
Figure 7B:
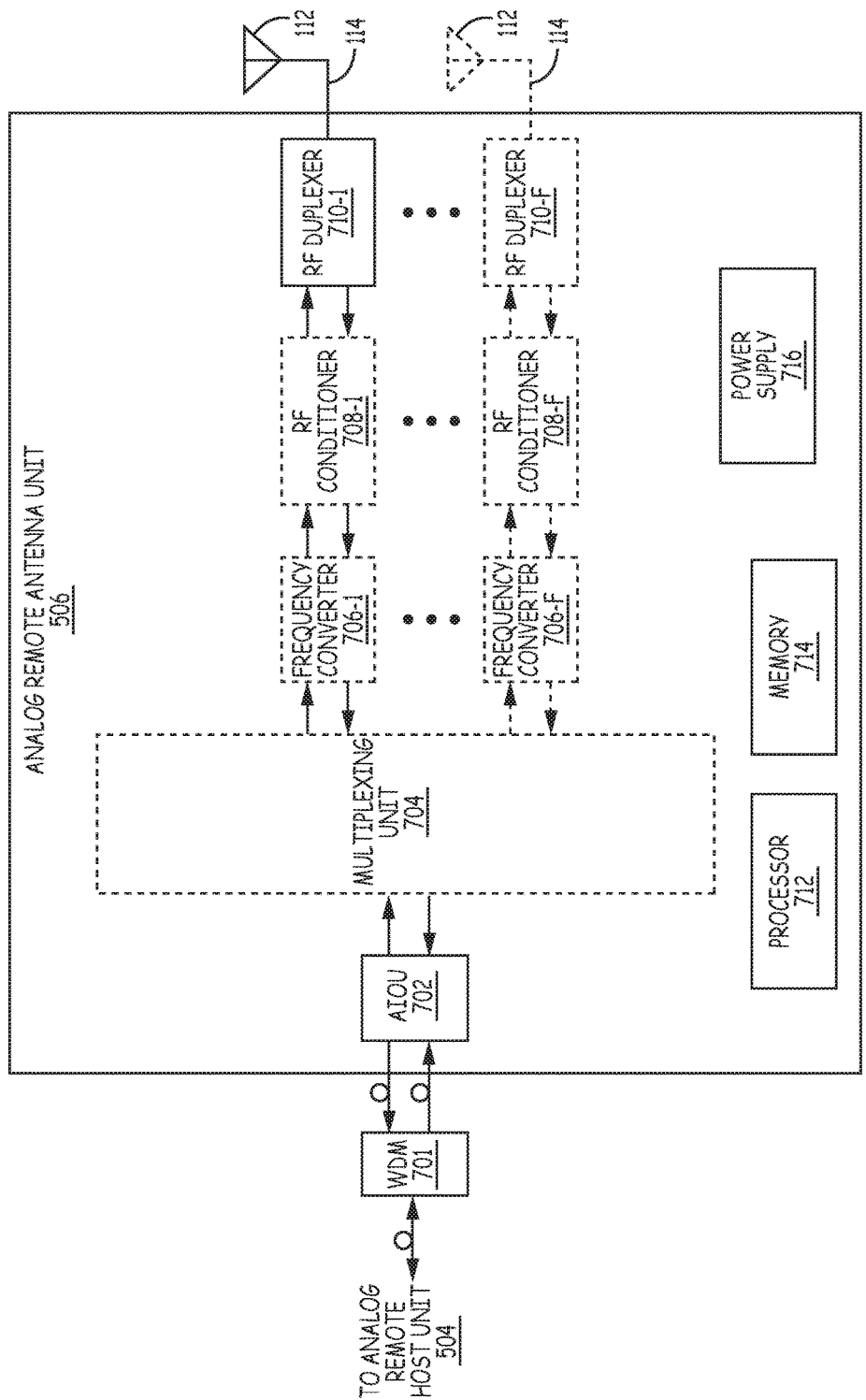
FIG. 7B is a block diagram of another exemplary embodiment of one of the analog remote antenna units shown in FIG. 5.

Block diagrams of an exemplary embodiment of analog remote antenna units 506 are shown in FIG. 7A and FIG. 7B. While the analog remote antenna unit 506 itself is the same in the embodiments shown in FIG. 7A and FIG. 7B, the implementation shown in FIG. 7A is coupled to an optical fiber pair 508 (including one downstream fiber and one upstream fiber) and the implementation shown in FIG. 7B is coupled to a single optical fiber 110 through a wavelength division multiplexer (WDM) 701 that multiplexes both the downlink and the uplink signals onto the single optical fiber 510.

Both embodiments of analog remote antenna unit 506 shown in FIG. 7A and FIG. 7B include an analog input/output unit (AIOU) 702, an optional multiplexing unit 704, at least one frequency converter 706 (for example, frequency converter 706-1 or optional frequency converter 706-F), optional RF conditioners 708 (for example, optional RF conditioner 708-1 or optional RF conditioner 708-F), RF duplexer 710 (such as RF duplexer 710-1 or optional RF duplexer 710-F), a processor 712, a memory 714, and a power supply 716. The analog input/output (AIOU) 702 receives the downstream aggregate multiplexed signal from a downstream optical fiber 508/510 and converts the optical signals into electrical signals that are passed to the optional multiplexing unit 704 (or directly to the frequency converter 706-1 in implementations without a multiplexing unit 704). The AIOU 702 also receives the upstream signals from the optional multiplexing unit 704 (or the frequency converter 706-1) and converts the electrical signals into optical signals that are output to an upstream optical fiber 508/510.

In implementations where multiple bi-directional frequency bands corresponding to multiple base station transceivers 502 have been multiplexed together at the analog remote host unit 504 and sent to the analog remote antenna unit 506, the optional multiplexing unit 704 receives the aggregate multiplexed electric signal in the downstream and demultiplexes the signals representing each bi-directional frequency band and routes the signals corresponding to each bi-directional frequency band to a different frequency converter 706 (for example, signals corresponding to a first bi-directional frequency band would be routed to a first frequency converter 706-1 while signals corresponding to a second bi-directional frequency band would be routed to a second frequency converter 706-2). In implementations where only a single bi-directional frequency band is communicated to and from the analog remote host unit 504, optional multiplexing unit 704 is not necessary and AIOU 702 is communicatively coupled directly to RF module frequency converter 706-1.

In the downstream, each frequency converter 706 receives a downstream analog intermediate frequency signal and up-converts it to a radio frequency signal. In some implementations, the up-converted radio frequency signal is at the same RF carrier frequency as the associated base station transceiver 502. The optional RF conditioner 708 conditions the radio frequency signal (for example, through amplification, attenuation, and filtering) before the RF duplexer 710 duplexes the downlink RF signal with the uplink RF signal onto the same coaxial cable 114 for transmission/reception using the antenna 112. In some implementations, optional IF conditioners can also be included upstream of the frequency converter 706 to condition the intermediate frequency signal (for example, through amplification, attenuation, and filtering) before the frequency converter up-converts it to a radio frequency signal.

In the upstream, each RF duplexer 710 splits the uplink RF signal received from the antenna 112 across the coaxial cable 114 from the downlink RF signal. The optional RF conditioner 708 conditions the uplink RF signal (for example, through amplification, attenuation, and filtering) before the frequency converter down-converts the RF signal to an upstream analog intermediate frequency signal. In some implementations, optional IF conditioners can also be included after the frequency conversion upstream of the frequency converter 706 to condition the intermediate frequency signal (for example, through amplification, attenuation, and filtering) after the frequency converter down-converts it to the analog intermediate frequency signal. The analog intermediate frequency signals are then passed to the analog remote host unit 504 through the optional multiplexing unit 704 and/or the AIOU 702.

A block diagram of an exemplary embodiment of analog remote expansion unit 507 is shown in FIG. 8. The implementation shown in FIG. 8 is coupled to an optical fiber pair 508 (including one downstream fiber and one upstream fiber). In other implementations, analog remote expansion unit 507 is coupled to a single optical fiber through a wavelength division multiplexer (WDM) that multiplexes both the downlink and the uplink signals onto the single optical fiber 510.

The implementation of analog remote expansion unit 507 shown in FIG. 8 includes an analog input/output unit (AIOU) 802, a switching unit 804, optional attribute analyzers 806 (for example, optional attribute analyzers 806-1 through 806-D), a plurality of analog input/output units (AIOU) 808 (for example, analog AIOUs 808-1 through 808-D), a processor 810, a memory 812, a computer readable storage medium 814, and a power supply 816. The AIOU 802 receives the downstream aggregate multiplexed signal from a downstream fiber of the optical fiber pair 508 and converts the optical signals into electrical signals that are passed to the switching unit 804. The AIOU 802 also receives the upstream signals from the switching unit 804 and converts the electrical signals into optical signals that are output to an upstream fiber of the optical fiber pair 508. While AIOU 802 is used in the implementation shown in FIG. 6 to interface with the analog remote host unit 504, other interfaces may also be used to interface with the analog remote host unit 504. In addition, digital remote expansion units could also be used that would interface with digital remote host unit 104 and have similar functionality as analog remote expansion unit 507.

Switching unit 804 receives the aggregate analog electronic signals for a plurality of radio frequency bands from the AIOU 802 and routes the downstream analog electric signals down paths based on the desired allocation of the radio frequency bands. In some embodiments, switching unit 804 multiplexes analog electric signals for multiple radio frequency bands onto the same downstream path. In some embodiments, switching unit 204 simulcasts analog electric signals for a single radio frequency band down multiple paths. In the upstream, switching unit 204 receives analog electric signals from various downstream analog remote antenna units 512 and routes them to the analog remote host unit 504 through the AIOU 802. In some embodiments, switching unit 804 aggregates uplink signals associated with a downlink simulcast signal and routes the aggregate uplink signal to the analog remote host unit 504 through the AIOU 802.

Switching unit 804 is communicatively coupled to the processor 810 and receives commands from the processor 810 to change the allocation and/or adjust the power level of radio frequency bands throughout the analog DAS 500. In some embodiments, switching unit 804 is implemented with a Serialized RF (SeRF board) commercially available from ADC Telecommunications, Inc. of Eden Prairie, Minn. as part of the FlexWave™ Prism line of products. The SeRF board is also described in U.S. patent application Ser. No. 11/627,251, assigned to ADC Telecommunications, Inc., published in U.S. Patent Application Publication No. 2008/0181282, and incorporated herein by reference.

Optional attribute analyzers 806 identify and analyze at least one attribute associated with either (or both) of the downlink digital samples or the uplink digital samples being sent to and from the analog remote antenna units 512. Each attribute analyzer is communicatively coupled to the processor 810. In some implementations of the embodiment shown in FIG. 8, the attributes relate to upstream signals received at the analog remote expansion unit 507 from at least one analog remote antenna unit 512. In some implementations of the embodiment shown in FIG. 8, the attributes relate to downstream signals sent from the analog remote expansion unit 507 to the at least one analog remote antenna unit 512. In some implementations of the embodiment shown in FIG. 8, the attributes relate to both upstream and downstream signals communicated between the analog remote expansion unit 507 and the analog remote antenna unit 512.

In some implementations of the embodiment shown in FIG. 8, the attribute is the power level or power density of the upstream signal received at the attribute analyzer 806 of the analog remote expansion unit 507 from an analog remote antenna unit 512. The attribute analyzers 806 in this implementation include power density detectors that determine the power density of the upstream signal. In other implementations, the attribute analyzers 806 are power density analyzers that determine the power density of the downstream signal or both the upstream and downstream signals. The analyzed data about the power density in either the downlink or the uplink (or both) is sent to the processor 810 for further processing.

In some implementations of the embodiment shown in FIG. 8, the attribute analyzers 806 work with the switching unit 804 and processor 810 to offer additional levels of dynamic allocation and/or power level adjustment downstream of the analog remote expansion unit 507, while the attribute analyzers 606 work with the switching unit 604 and processor 610 to offer a higher level of dynamic allocation and/or power level adjustment upstream of the analog remote expansion unit 507.

In some implementations, the processor 810 is implemented using a suitable programmable processor (such as a microprocessor or a microcontroller) that executes software 818 stored on the computer readable storage medium 814. The software 818 implements at least some of the functionality described here as being implemented by the analog remote expansion unit 507, including any additional levels of dynamic allocation and/or power level adjustment downstream of the analog remote expansion unit 507. The software 818 comprises program instructions that are stored (or otherwise embodied) on an appropriate computer readable storage medium or media 614 (such as flash or other non-volatile memory, magnetic disk drives, and/or optical disc drives). At least a portion of the program instructions are read from the computer readable storage medium 814 by the programmable processor 810 for execution thereby. The computer readable storage medium 814 on or in which the program instructions are embodied is also referred to here as a "program-product". Although the computer readable storage media 814 is shown in FIG. 8 as being included in, and local to, the analog remote expansion unit 507, it is to be understood that remote storage media (for example, storage media that is accessible over a network or communication link) and/or removable media can also be used. The analog remote expansion unit 507 also includes memory 812 for storing the program instructions (and any related data) during execution by the programmable processor. Memory 812 comprises, in one implementation, any suitable form of random access memory (RAM) now known or later developed, such as dynamic random access memory (DRAM). In other embodiments, other types of memory are used.

The software 818 includes correlation functionality 820 and capacity allocation functionality 822. Correlation functionality 820 operates similarly to correlation functionality 620 and capacity allocation functionality 822 operates similarly to capacity allocation functionality 622. The processor 810 directs switching unit 804 to dynamically allocate capacity to and/or from the downstream analog remote antenna units 512 based on correlation of input received from the attribute analyzers 806 in a similar manner to how processor 610 directs switching unit 604 to dynamically allocate capacity between the analog remote host unit 504 and both remote analog antenna units 506 and analog remote expansion units 507.

AIOUs 808 receive the downstream analog intermediate frequency signals from switching unit 804 and combine both the downstream and the upstream electrical signals onto a single coaxial cable 514 (or other suitable communication medium) for communication to an analog remote antenna unit 512. AIOUs 808 also receive upstream signals from the analog remote antenna units 512 and splits the downstream and upstream electrical signals from the single coaxial cable 514 for communication to the switching unit 804 and/or the optional attribute analyzer 806.

Figure 9:
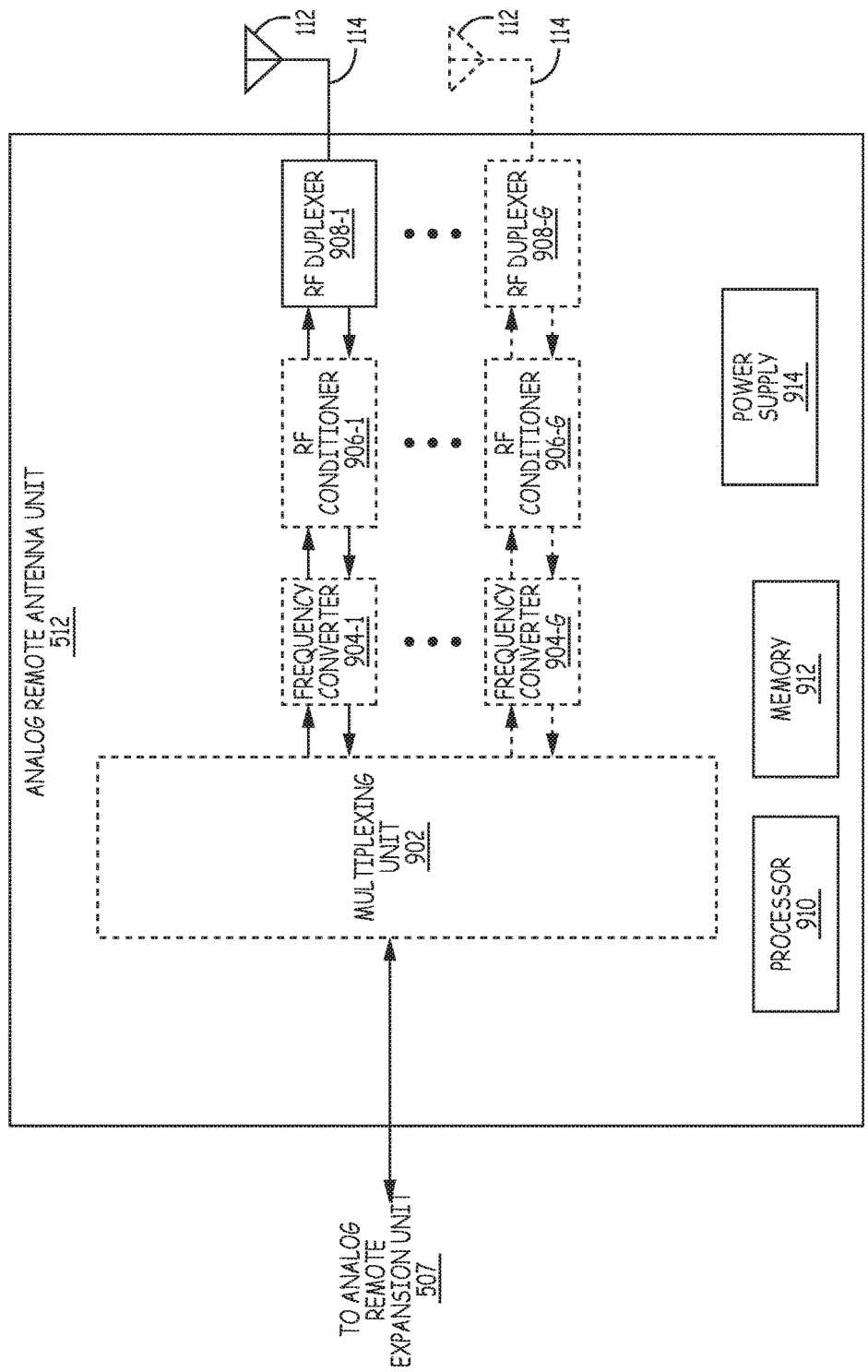
FIG. 9 is a block diagram of an exemplary embodiment of one of the analog remote antenna units shown in FIG. 5.

A block diagram of an exemplary embodiment of an analog remote antenna unit 512 is shown in FIG. 9. The implementation shown in FIG. 9 is coupled to the analog remote expansion unit 507 through a coaxial cable 514 (or other suitable communication medium). The implementation of analog remote antenna unit shown in FIG. 9 includes a multiplexing unit 902, at least one frequency converter 904 (for example, frequency converter 904-1 or optional frequency converter 904-G), at least one RF conditioner 906 (for example, RF conditioner 906-1 or optional RF conditioner 906-G), at least one RF duplexer 908 (for example, RF duplexer 908-1 or optional RF duplexer 908-G), a processor 910, memory 912, and a power supply 914.

In implementations where multiple bi-directional frequency bands corresponding to multiple base station transceivers 502 have been multiplexed together at the analog remote expansion unit 507 and sent to the analog remote antenna unit 512, the optional multiplexing unit 902 receives the downstream aggregate multiplexed signal from a coaxial cable 514 and demultiplexes the signals representing each bi-directional frequency band and routes the signals corresponding to teach bi-directional frequency band to a different frequency converter 904 (for example, signals corresponding to a first bi-directional frequency band would be routed to a first frequency converter 904-1 while signals corresponding to a second bi-directional frequency band would be routed to a second frequency converter 904-2). In implementations where only a single bi-directional frequency band is communicated to and from the analog remote host unit 504, optional multiplexing unit 902 is not necessary and the frequency converter 904 is communicatively coupled directly to the coaxial cable 514 through an interface.

In the downstream, each frequency converter 904 receives a downstream analog intermediate frequency signal and up-converts it to a radio frequency signal. In some implementations, the up-converted radio frequency signal is the same RF carrier frequency as the associated base station transceiver 502. The optional RF conditioner 906 conditions the radio frequency signal (for example, through amplification, attenuation, and filtering) before the RF duplexer 908 duplexes the downlink RF signal with the uplink RF signal onto the same coaxial cable 114 for transmission/reception using the antenna 112. In some implementations, optional IF conditioners can also be included upstream of the frequency converter 904 to condition the intermediate frequency signal (for example, through amplification, attenuation, and filtering) before the frequency converter up-converts it to a radio frequency signal.

In the upstream, each RF duplexer 908 splits the uplink RF signal received from the antenna 112 across the coaxial cable 114 from the downlink RF signal. The optional RF conditioner 906 conditions the uplink RF signal (for example, through amplification, attenuation, and filtering) before the frequency converter down-converts the RF signal to an upstream analog intermediate frequency signal. In some implementations, optional IF conditioners can also be included after the frequency conversion upstream of the frequency converter 904 to condition the intermediate frequency signal (for example through amplification, attenuation, and filtering) after the frequency converter down-converts it to the analog intermediate frequency signal. The analog intermediate frequency signals are then passed to the analog remote expansion unit 507 through the optional multiplexing unit 902 or directly.

FIG. 10 is a block diagram of one exemplary embodiment of a hybrid distributed antenna system (DAS) 1000 in which dynamic capacity allocation and/or power level adjustment techniques described here can be implemented. Although the dynamic capacity allocation and/or power level adjustment techniques described here are described in connection with a hybrid DAS 1000 shown in FIG. 10, it is to be understood that the dynamic capacity allocation and/or power level adjustment techniques described here can be used in other DAS, repeater, or distributed base station products and systems (for example, a "pure" digital DAS, an optimized-BTS DAS, or a "pure" analog DAS).

The hybrid DAS 1000 is used to distribute bi-directional wireless communications between one or more base station transceivers 102 (for example, base station transceivers 102-1 through 102-A) and one or more wireless devices 103 (such as mobile wireless devices such as mobile telephones, mobile computers, and/or combinations thereof such as personal digital assistants (PDAs) and smartphones). In the exemplary embodiment shown in FIG. 10, the hybrid DAS 1000 is used to distribute a plurality of bi-directional radio frequency (RF) bands. Each radio frequency band is typically used to communicate multiple logical bi-directional RF channels.

The techniques described here are especially useful in connection with the distribution of wireless communications that use licensed radio frequency spectrum, such as cellular radio frequency communications. Examples of such cellular RF communications include cellular communications that support one or more of the second generation, third generation, and fourth generation Global System for Mobile communication (GSM) family of telephony and data specifications and standards, one or more of the second generation, third generation, and fourth generation Code Division Multiple Access (CDMA) family of telephony and data specifications and standards, and/or the WiMAX family of specification and standards. In the particular exemplary embodiment described here in connection with FIG. 10, the hybrid DAS 1000 is configured to handle eight cellular bi-directional radio frequency bands. In other embodiments, the hybrid DAS 1000 is configured to handle greater or fewer cellular bi-directional radio frequency bands. In other embodiments, the hybrid DAS 1000 and the dynamic capacity allocation and/or power level adjustment techniques described here are also used with wireless communications that support one or more of the IEEE 802.11 family of standards. In some implementations, the hybrid DAS 1000 is configured to handle time division duplexed signals, which is used, for example, in some WiMAX implementations. In some implementations, the hybrid DAS 1000 is configured to handle two-way communication on the same frequency using a s witched input/output.

In the particular exemplary embodiment described here in connection with FIG. 10, the hybrid DAS 1000 is configured to distribute wireless communications that use frequency division duplexing to implement logical bi-directional RF channels. In other embodiments, the hybrid DAS 1000 is configured to communicate at least some wireless communications that use other duplexing techniques (such as time division duplexing, which is used, for example, in some WiMAX implementations).

Each of the bi-directional radio frequency bands distributed by the hybrid DAS 1000 includes a separate radio frequency band for each of two directions of communications. One direction of communication goes from the base station transceiver 102 to the wireless device 103 and is referred to here as the "downstream" or downlink" direction. The other direction of communication goes from the wireless device 103 to the base station transceiver 102 and is referred to here as the "upstream" or "uplink" direction. Each of the distributed bi-directional radio frequency bands includes a "downstream" band in which downstream RF channels are communicated for that bidirectional radio frequency band and an "upstream" band in which upstream RF channels are communicated for that bidirectional radio frequency band.

In the particular exemplary embodiment shown in FIG. 10, the hybrid DAS 1000 comprises a digital remote host unit 104, at least one hybrid remote host unit 1002 (such as hybrid remote host unit 1002-1 and any quantity of optional hybrid remote host units 1002 through hybrid remote host unit 1002-I), and one or more analog remote antenna units 1003 (for example, analog remote antenna units 1003-1 through 1003-F and optional analog remote antenna units 1003-G through 1003-H). The digital remote host unit 104 is communicatively coupled to the one or more base station transceivers 102 either directly (for example, via one or more coaxial cable connections) or indirectly (for example, via one or more donor antennas and one or more bidirectional amplifiers).

In the particular exemplary embodiment shown in FIG. 10, the digital remote host unit 104 can be communicatively coupled to up to thirty-two analog remote antenna units 1003 through at least one hybrid remote host unit 1002. The eight bi-directional radio frequency bands supported by the hybrid DAS 1000 can be dynamically allocated amongst the thirty-two analog remote antenna units 1003 in various ways as further described below. In other embodiments, the digital remote host unit 104 can be communicatively coupled to greater or fewer quantities of analog remote antenna units 506 through greater or fewer quantities of hybrid remote host units 1002. The relationship between the quantity of radio frequency bands supported by the hybrid DAS 1000 to the quantity of analog remote antenna units 1003 communicatively coupled to the digital remote host unit 104 varies in different embodiments.

In the particular exemplary embodiment shown in FIG. 10, the digital remote host unit 104 communicates digital transport signals with the at least one hybrid remote host unit 1002. These digitized transport signals are digitized intermediate frequency signals. As indicated above, for purposes of this description, the terms "intermediate frequency" and "intermediate frequencies" encompasses frequencies that are not either baseband frequencies or radio frequencies. In other embodiments, the transport signals are can be either digital or analog intermediate frequency transport signals.

In the particular exemplary embodiment shown in FIG. 10, the digital remote host unit 104 is communicatively coupled to at least one hybrid remote host unit 1002 (for example, hybrid remote host unit 1002-1) using an optical fiber pair 1004 (or other digital communication link) and connected to other hybrid remote host units (for example, hybrid remote host unit 1002-I) using a single optical fiber 1006 (or other digital communication link). At least a subset of the eight bi-directional frequency bands can be communicated between the digital remote host unit 104 and the hybrid remote host units 1002 using the optical fiber pairs 1004 or the single optical fiber 1006 when capacity is allocated to the hybrid remote host units 1002.

The number of fiber pairs that are used depends on factors such as the bandwidth requirements for all frequencies. In the particular exemplary embodiments shown in FIG. 10, some hybrid remote host units 1002 are connected with an optical fiber pair 1004 (such as hybrid remote host unit 1002-1) while other hybrid remote host units 1002 are connected with a single optical fiber 1006 (such as hybrid remote host unit 1002-I). In some implementations of the particular exemplary embodiment shown in FIG. 10, one fiber of each optical fiber pair 1004 is used to communicate downstream data from the digital remote host unit 104 to the hybrid remote host unit 1002 (and is also referred to here as the "downstream" fiber 1004), and the other fiber of each optical fiber pair 1004 is used to communicate upstream data from the hybrid remote host units 1002 to the digital remote host unit 104 (and is also referred to here as the "upstream" fiber 1004). In some implementations, both the fiber used for downlink communication and the fiber used for uplink communication communicate more than one radio frequency band. In some implementations of the particular exemplary embodiment shown in FIG. 10, the single optical fiber 1006 is used to communicate both downlink communication and uplink communication (such as with hybrid remote host unit 1002-I). In these implementations, the downlink and uplink communication are multiplexed onto the single optical fiber 1006 (for example, by using a wavelength division multiplexer described below).

In the particular exemplary embodiment shown in FIG. 10, each hybrid remote host unit 1002 is communicatively coupled to at least one analog remote antenna unit 1003. For example, hybrid remote host unit 1002-1 is communicatively coupled to analog remote antenna unit 1003-1 through analog remote antenna unit 1003-F while optional hybrid remote host unit 1002-I is communicatively coupled to optional analog remote antenna unit 1003-G through optional analog remote antenna unit 1003-H. In exemplary embodiments, the eight bi-directional radio frequency bands supported by the hybrid DAS 1000 can be dynamically allocated amongst thirty-two analog remote antenna units 1003 in various ways. In other embodiments, the at least one hybrid remote host units 1002 can be communicatively coupled to greater or fewer quantities of analog remote antenna units 1003. The relationship between the quantity of radio frequency bands supported by the hybrid DAS 1000 to the quantity of analog remote antenna units 1003 communicatively coupled to the hybrid remote host units 1002 varies in different embodiments.

In the particular exemplary embodiment shown in FIG. 10, the hybrid remote host unit 1002 converts between digital transport signals and analog transport signals and communicates analog transport signals with the at least one analog remote antenna units 1003. These analog transport signals are analog intermediate frequency signals. As indicated above, for purposes of this description, the terms "intermediate frequency" and "intermediate frequencies" encompasses frequencies that are not either baseband frequencies or radio frequencies. In other embodiments, the transport signals are can be either digital or analog intermediate frequency transport signals.

In the particular exemplary embodiment shown in FIG. 10, the at least one hybrid remote host unit 1002 is communicatively coupled to at least one analog remote antenna unit 1003 (for example, analog remote antenna unit 1003-1) using coaxial cable. In other embodiments, the at least one hybrid remote host unit 1002 is communicatively coupled to analog remote antenna units 1003 through at least one pair of optical fibers (such as a single optical fiber or a pair of optical fibers). At least a subset of the eight bi-directional frequency bands can be communicated between the hybrid remote host unit 1002-1 and the analog remote antenna units 1003-1 and 1003-F using the analog communication link 1008 (such as coaxial cable, fiber, twisted pair, or air media). In exemplary embodiments, at least a subset of the eight bi-directional frequency bands can be communicated between the hybrid remote host unit 1002-I and the analog remote antenna unit 1003-G using optical fiber pairs 508 when capacity is allocated to the analog remote antenna unit 1003-G. In exemplary embodiments, at least a subset of the eight bi-directional frequency band can be communicated between the hybrid remote host unit 1002-I and the analog remote antenna unit 1003-H using single optical fiber 510 when capacity is allocated to the analog remote antenna unit 1003-H.

The number of coaxial cable or fiber pairs that are used depends on factors such as the bandwidth requirements for all frequencies. In the particular exemplary embodiments shown in FIG. 10, some analog remote antenna units 1003 are connected with a single coaxial cable or other electrical communication media (such as analog remote antenna units 1003-1), other analog remote antenna units 1003 are connected with a plurality of single coaxial cable or other electrical communication media, other analog remote antenna units 1003 are connected with an optical fiber pair 508 (such as analog remote antenna units 1003-G), while other analog remote antenna units 506 are connected with a single optical fiber 510 (such as analog remote antenna unit 1003-H). While certain types of digital and analog media are described as being implemented in various portions of hybrid DAS 1002, it is understood that in other embodiments other types of digital and/or analog media are used, such as at least one optical fiber, at least one coaxial cable, at least one twisted pair, or wireless media.

In some implementations of the particular exemplary embodiment shown in FIG. 10, one electrical media is used to communicate both downstream and upstream data. In other implementations, one electrical medium is used for downstream data and another is used for upstream data. In some implementations of the particular exemplary embodiment shown in FIG. 10, one fiber of each optical fiber pair 508 is used to communicate downstream data from the hybrid remote host unit 1002 to the analog remote antenna units 1003 (and is also referred to here as the "downstream" optical fiber 508), and the other fiber of each optical fiber pair 508 is used to communicate upstream data from the analog remote antenna units 1003 to the hybrid remote host unit 1002 (and is also referred to here as the "upstream" fiber 508). In some implementations, both the fiber used for downlink communication and the fiber used for uplink communication communicate more than one radio frequency band. In some implementations of the particular exemplary embodiment shown in FIG. 10 (such as analog remote antenna unit 1003-H), the single optical fiber 510 is used to communicate both downlink communication and uplink communication. In these implementations, the downlink and uplink communication are multiplexed onto the single optical fiber 510 (for example, by using a wavelength division multiplexer described below).

Each analog remote antenna unit 1003 is communicatively coupled to a respective antenna 112 (for example, antennas 112-1 through 112-F and antennas 112-G through 112-H) over a respective coaxial cable 114 (such as a 50 Ohm coaxial cable). While coaxial cable is described as coupling the analog remote antenna units 1003 to the hybrid remote host units 1002, it is understood that fiber optic or other communication media may be used in other implementations.

The components of the hybrid DAS 1000 operate according to the description above with reference to the digital remote host unit 104 and analog remote antenna units 1003 described above. A block diagram of an exemplary embodiment of the hybrid remote host unit 1002 is shown in FIG. 11. In the particular embodiment shown in FIG. 11, the hybrid remote host unit 1002 includes at least one digital input/output unit (DIOU) 1102 (such as DIOU 1102-1 through 1102-B), at least one digital multiplexing unit (DMU) 1104, at least one digital/analog conversion units (DACU) 1106 (such as DACU 1106-1 and optional DACU 1106-J), at least one analog switching unit (ASU) 1108, a plurality of attribute analyzers 1110 (such as attribute analyzer 1110-1 through attribute analyzer 1110-F), a plurality of analog input/output units (AIOU) 1112 (such as AIOU 1112-1 through AIOU 1112-F), at least one processor 1114, at least one memory 1116, at least one computer readable storage medium 1118, and at least one power supply 1120.

The hybrid remote host unit 1002 communicates at least one band of digitized spectrum with at least one digital remote host unit 104 in the form of a multiplexed digitized signal containing N-bit words of digitized spectrum. The multiplexed digitized signal is received at the at least one DIOU 1102 through at least one optical fiber pair 1004 (or other digital communication link). In the embodiment shown in FIG. 11, only one DIOU 1102-1 is necessary if the hybrid remote host unit 1002 is only coupled with a single upstream digital remote host unit 104-1 (or single upstream digital expansion unit). DIOU 1102-I is optional. For example, in other embodiments, hybrid remote host unit 1002 has multiple DIOUs 1102 (DIOU 1102-1 through DIOU 1102-I) and is connected to multiple upstream digital remote host units 104 or digital expansion units through optical fiber pair 1004 (or other digital communication link). In other embodiments, hybrid remote host unit 1002 is connected to a single digital remote host unit 104-1 via multiple digital communication links 1004 and multiple DIOU 1102. In exemplary implementations, one DIOU 1102-1 is used for downstream communication from the digital multiplexing unit 1104 and another DIOU 1102-I is used for upstream communication to the digital multiplexing unit 1104. In other embodiments, hybrid remote host unit 1002 is connected to other hybrid remote host units 1002 through at least one DIOU 1102.

The at least one DIOU 1102 communicates the multiplexed digitized signal containing N-bit words of digitized spectrum to the at least one DMU 1104. The at least one DMU 1104 demultiplexes N-bit words of digitized spectrum received from the at least one DIOU 1102 and sends N-bit words of digitized spectrum to the at least one DACU 1106 (such as DACU 1106-1 through optional DACU 1106-J). The at least one DACU 1106 converts the N-bit words of digitized spectrum to at least one band of analog spectrum. In some embodiments, the at least one DACU 1106 converts the digitized signal back to the original analog frequency provided by the base station transceiver 102. In other embodiments, the at least one DACU 1106 converts the digitized signal to an intermediate frequency (IF) for transport across the at least one analog communication link 1008. In other embodiments, other components are included in the hybrid remote host unit 1002 that frequency convert at least one band of analog spectrum output by the DACU 1106 into an intermediate frequency for transport.

Each DACU 1106 is coupled with the at least one ASU 1108. Each DACU 1106 also converts at least one band of analog spectrum received from the ASU 1108 into N-bit words of digitized spectrum. ASU 1108 receives multiple bands of analog spectrum from multiple DACU 1106 and multiplexes the bands of analog spectrum together into at least one multiplexed analog signal including multiple bands of analog spectrum. In some embodiments, there are a plurality of multiplexed analog signals output from the ASU 1108. In some embodiments, all of the bands of analog spectrum from each DACU 1106 are included on each multiplexed signal output by ASU 1108. In other embodiments, a subset of the bands of analog spectrum from a plurality of DACU 1106 are multiplexed onto one signal output eventually on one of the at least one analog communication link 1008 to a first analog remote antenna unit 1003-1, while a different subset of bands of analog spectrum from a plurality of DACU 1106 are multiplexed onto another signal output eventually on another of the at least one analog communication link 1008 to a second analog remote antenna unit 1003-F. In other embodiments, different combinations of bands of analog spectrum from various DACU 1106 are multiplexed and eventually output onto various analog communication links 1008.

The at least one ASU 1108 is coupled with a plurality of attribute analyzers 1110 (such as attribute analyzer 1110-1 through attribute analyzer 1110-F). Attribute analyzers 1110 identify and analyze at least one attribute associated with either (or both) of the downlink analog intermediate frequency transport signals or the uplink analog intermediate frequency transport signals being sent to and from the analog remote antenna units 1003 and the hybrid remote host unit 1002. Each attribute analyzer is communicatively coupled to the processor 1114. In some implementations of the embodiment shown in FIG. 11, the attributes relate to upstream signals received at the hybrid remote host unit 1002 from at least one analog remote antenna unit 1003 and/or analog remote expansion unit. In some implementations of the embodiment shown in FIG. 11, the attributes relate to the downstream signals sent from the hybrid remote host unit 1002 to the at least one analog remote antenna unit 1003 and/or analog remote expansion unit. In some implementations of the embodiment shown in FIG. 11, the attributes relate to both upstream and downstream signals communicated between the hybrid remote host unit 1002 and the analog remote antenna unit 1003 and/or analog remote expansion unit.

In some implementations of the embodiment shown in FIG. 11, the attribute is the power level or power density of the upstream signal received at the at least one attribute analyzer 1110 of the hybrid remote host unit 1002 from an analog remote antenna unit 1003. The attribute analyzers 1110 in this implementation include power density detectors that determine the power density of the upstream signal. In other implementations, the attribute analyzers 1110 are power density analyzers that determine the power density of the downstream signal or both the upstream and downstream signals. The analyzed data about the power density in either the downlink or the uplink (or both) is sent to the processor 610 for further processing.

Each analog input/output unit (AIOU) 1112 is an interface between the electronic signals used on the hybrid remote host unit 1002 and the signals communicated across the at least one analog communication link 1008 (such as coaxial cable, single or pairs of optical fibers, etc.) to the analog remote antenna units 1003 and/or analog remote expansion units. In exemplary embodiments where the analog communication link 1008 is at least one optical fiber, an AIOU 1112 converts between electrical and optical signals in the downlink and converts between optical and electrical signals in the uplink. In exemplary embodiments, a wavelength divisional multiplexer (WDM) is also used to multiplex both the downlink and uplink optical signals onto a single fiber when only a single optical fiber is used to couple the hybrid remote host unit 1002 with an analog remote antenna unit 1003 or an analog remote expansion unit.

In some embodiments, each DACU 1106 converts a band of digitized spectrum to a different analog frequency from the other DACU 1106. Each band of analog spectrum is pre-assigned to a particular analog frequency. Then, the ASU 1108 multiplexes the various pre-assigned analog frequencies together. In exemplary embodiments, the ASU 1108 also multiplexes a reference clock and any communication, control, or command signals and outputs them in a downlink signal path destined to at least one analog remote antenna unit 1003. In other embodiments, each DACU 1106 converts a band of analog spectrum to the same analog frequency as the other DACU 1106. Then, the ASU 1108 shifts the received signals into distinct analog frequencies and multiplexes them together and outputs them using at least one analog communication link 1008. In the embodiment shown in FIG. 11, the ASU 1108 multiplexes the analog frequencies received from each DACU 1106 onto corresponding downlink signal paths destined to at least one analog remote antenna unit 1003.

In other embodiments, bands of frequency spectrum from certain DACU 1106 are selectively distributed to signal paths destined to certain analog remote antenna units 1003. In one example embodiment, an analog communication link 1008-1 is coupled to analog remote antenna unit 1003-1 and only a first subset of bands of analog spectrum are transported using analog communication link 1008-1. Further, analog communication link 1008-2 is coupled to analog remote antenna unit 1003-F and only a second subset of bands of analog spectrum are transported using analog communication link 1008-F. In another embodiment, a first subset of bands of analog spectrum are transported to analog remote antenna unit 1003-1 using analog communication link 1008-1 and a second subset of bands of analog spectrum are transported to the same analog remote antenna unit 1003-1 using a second analog communication link 1008. In exemplary embodiments, a pair of analog communication links 1008 are fibers, such as analog communication links 1008-G between hybrid remote host unit 1002-E and analog remote antenna unit 1003-G. In exemplary embodiments, a single fiber is used as the analog communication link 1008, such as analog communication link 1008-H between hybrid remote host unit 1002-E and analog remote antenna unit 1003-H. While analog remote antenna units 1003 have been shown and described, in other exemplary embodiments analog remote antenna clusters including a plurality of analog remote antenna units 1003 are connected to a hybrid remote host unit 1002. It is understood that these examples are not limiting and that other system hierarchies and structures are used in other embodiments.

In exemplary embodiments, each DMU 1104, DACU 1106, and ASU 1108 is synchronized with the other components of hybrid remote host unit 1002 and the hybrid DAS 1000 generally. In exemplary embodiments, the hybrid remote host unit 1002 extracts a clock from the signal received from a digital remote host unit 104 and uses that to synchronize the various components of the hybrid remote host unit 1002 and can pass an analog reference clock on to the analog remote antenna units 1003. In exemplary embodiments, the hybrid remote host unit 1002 can pass a reference clock upstream to other components of the system, such as to a digital remote host unit 104.

Attribute analyzers 606 identify and analyze at least one attribute associated with either (or both) of the downlink analog intermediate frequency transport signals or the uplink analog intermediate frequency transport signals being sent to and from the analog remote antenna units 506 and the analog remote expansion units 507. Each attribute analyzer is communicatively coupled to the processor 610. In some implementations of the embodiment shown in FIG. 2, the attributes relate to upstream signals received at the analog remote host unit 504 from at least one analog remote antenna unit 506 and/or analog remote expansion unit 507. In some implementations of the embodiment shown in FIG. 6, the attributes relate to the downstream signals sent from the analog remote host unit 504 to the at least one analog remote antenna unit 506 and/or analog remote expansion unit 507.

In some implementations of the embodiment shown in FIG. 6, the attributes relate to both upstream and downstream signals communicated between the analog remote host unit 504 and the analog remote antenna unit 506 and/or analog remote expansion unit 507.

In some implementations of the embodiment shown in FIG. 6, the attribute is the power level or power density of the upstream signal received at the attribute analyzer 606 of the analog remote host unit 504 from an analog remote antenna unit 506. The attribute analyzers 606 in this implementation include power density detectors that determine the power density of the upstream signal. In other implementations, the attribute analyzers 606 are power density analyzers that determine the power density of the downstream signal or both the upstream and downstream signals. The analyzed data about the power density in either the downlink or the uplink (or both) is sent to the processor 610 for further processing.

Each analog input/output unit (AIOU) 608 is an optical/electronic interface between the electronic signals used on the digital remote host unit 104 and the optical signals communicated across optical fiber pairs 508 and single optical fibers 510 to the analog remote antenna units 506 and/or analog remote expansion units 507. Each AIOU 608 converts between electrical and optical signals in the downlink and converts between optical and electrical signals in the uplink. A wavelength divisional multiplexer (WDM) 609 is used to multiplex both the downlink and uplink optical signals onto a single fiber when only a single optical fiber 510 is used to couple the analog remote host unit 504 with an analog remote antenna unit 506 (such as analog remote antenna unit 506-3 shown in FIG. 5) or an analog remote expansion unit 507.

The processor 1114 is communicatively coupled to the analog switching unit (ASU) 1108 and each attribute analyzer 1110 to implement dynamic capacity allocation and/or power level adjustment. The processor 1114 is implemented using a suitable programmable processor (such as a microprocessor or a microcontroller) that executes software 1122 stored on the computer readable storage medium 1118. The software 1122 implements at least some of the functionality described here as being implemented by the hybrid remote host unit 1002, including the dynamic capacity allocation and/or power level adjustment. The software 1122 comprises program instructions that are stored (or otherwise embodied) on an appropriate computer readable storage medium or media 1118 (such as flash or other non-volatile memory, magnetic disc drives, and/or optical disc drives). At least a portion of the program instructions are read from the computer readable storage medium 1118 by the programmable processor for execution thereby. The computer readable storage medium 1118 on or in which the program instructions are embodied is also referred to here as a "program-product". Although the computer readable storage media 1118 is shown in FIG. 11 as being included in, and local to, the hybrid remote host unit 1002, it is to be understood that remote storage media (for example, storage media that is accessible over a network or communication link) and/or removable media can also be used. The hybrid remote host unit 1002 also includes memory 1116 for storing the program instructions (and any related data) during execution by the programmable processor. Memory 1116 comprises, in one implementation, any suitable form of random access memory (RAM) now known or later developed, such as dynamic random access memory (DRAM). In other embodiments, other types of memory are used.

Software 1122 includes correlation functionality 1124 and capacity allocation functionality 1126. Correlation functionality 1124 correlates analyzed attribute data received from each attribute analyzer 606 with a plurality of profiles associated with different usage patterns for analog remote antenna units 1003 in hybrid DAS 1000. The correlation functionality 1124 determines how the analyzed attribute data received from a particular attribute analyzer correlates to a particular profile. The closer the match between the analyzed attribute data and the profile, the higher the correlation. In some implementations of the embodiment shown in FIG. 11, the correlation functionality 1124 generates a set of correlation probabilities for each of the profiles.

For example, correlation functionality 1124 could determine that there is a high correlation between the analyzed attribute data received from attribute analyzer 1110-1 and a profile indicating high usage. In contrast, correlation functionality 1124 could determine that there is a low correlation between the analyzed attribute data received from attribute analyzer 1110-F and the profile indicating high usage. Instead, correlation functionality 1124 could determine that there is a high correlation between the analyzed attribute data received from the attribute analyzer 1110-F and the profile indicating low or no usage. In some implementations of the embodiment shown in FIG. 11, the correlation functionality 1124 is initially setup by generating profiles for attributes based on known configurations having various attributes. In other words, the system would be configured into a specific usage scenario and a baseline profile for that scenario would be generated for subsequent correlation.

Once correlation functionality 1124 has performed correlations between analyzed attribute data received from each attribute analyzer 606 and the plurality of profiles, capacity allocation functionality 1126 analyzes the correlations to determine the current usage amongst the analog remote antenna units 1003 in hybrid DAS 1000. In some implementations of the embodiment shown in FIG. 11 where the attribute is the power density of the upstream signals, one power density profile will correlate best to the currently received upstream signals. The power density profile that correlates best to the currently received upstream signals corresponds to the current capacity utilization for the corresponding analog remote antenna unit 1003.

In some implementations, the capacity allocation functionality determines the current usage amongst the analog remote antenna units 1003 as a percentage of the capacity currently allocated to each analog remote antenna unit 1003 (for example, analog remote antenna unit 1003-1 may be using 100% of the capacity currently allocated to it, while analog remote antenna unit 1003-2 is only using 20% of the capacity currently allocated to it).

Capacity allocation functionality 1126 then dynamically allocates capacity to the analog remote antenna units 1003 that need additional capacity by shifting capacity from the analog remote antenna units 1003 that are currently utilizing a lower percentage of their currently allocated capacity. Capacity allocation functionality 1126 instructs analog switching unit (ASU) 1108 to allocate the capacity accordingly and analog switching unit (ASU) 1108 routes additional base station transceivers 102 to analog remote antenna units 1003 that currently require additional capacity. Thus, more capacity is dynamically allocated to analog remote antenna units 1003 that have higher current capacity usage while less capacity is dynamically allocated to analog remote antenna units 1003 that have a lower current capacity usage.

In exemplary embodiments, capacity allocation functionality 1126 also adjusts the power level at the analog remote antenna units 1003 to better allocate capacity such as by shifting capacity from and/or lowering power levels of the analog remote antenna units 1003 that are currently utilizing a lower percentage of their currently allocated capacity. The power level adjustment can be included as a power level indication sent to analog switching unit (ASU) 1108 and embedded in the signals sent to the analog remote antenna units 1003 where they will be used to adjust the power of the radio frequency signals radiated at the analog remote antenna units 1003.

Analog switching unit (ASU) 1108 switches the connections between the base station transceivers 102 and the various analog communication links 1008. For each downstream media and/or channel of a media, the hybrid remote host unit 1002 multiplexes the analog intermediate frequency signals for one or more downstream frequency bands (along with the overhead data such as, for example, synchronization data and gain control data) and communicates the resulting aggregate multiplexed signal to at least some of the analog remote antenna units 1003 over the downstream optical fiber 508 (and the downstream channel of each single optical fiber 510). In some embodiments, additional switches are also positioned within other components of the analog DAS 500, such as the analog remote antenna units 506 and/or the analog remote expansion units 507, so that additional levels of dynamic allocation can occur at various levels.

In exemplary embodiments, the at least one processor 1114 is used to control the at least one DMU 1104, the at least one digital analog conversion unit (DACU) 1106, the at least one analog switching unit (ASU) 1108, the at least one attribute analyzer 1110, and/or other components of the hybrid remote host unit 1002. In exemplary embodiments, an input/output (I/O) line is coupled to the CPU and is used for network monitoring and maintenance. In exemplary embodiments, the I/O line is an Ethernet port used for external communication with the system. Power supply 1120 is used to power various components within the hybrid remote host unit 1002.

In exemplary embodiments and in addition to performing the analog frequency conversion functions described above, the AIOU 1112 couple power onto the analog communication links 1008. This power is then supplied through the analog communication link 1008 to at least one downstream analog remote antenna unit 1003 or an analog remote antenna unit cluster. The power coupled onto the analog communication link 1008 is supplied from the power supply 1120. In exemplary embodiments, 28 volts DC is received by the AIOU 1112 from the power supply 1120 and is coupled to at least one analog communication link 10088 by at least one AIOU 1112.

The hybrid remote host unit 1002 shown in FIG. 11 sends and receives digital signals from the upstream and sends and receives analog signals in the downstream. In other example hybrid expansion units, both analog and digital signals can be sent in the downstream across various media. In one example embodiment a digital downstream output line (not shown) is connected to the downstream side of the DMU 1104 and goes through a DIOU before being output in the downstream. This digital downstream output line does not go through a DACU 1106 or the ASU 1108. In other example embodiments of the hybrid remote host unit 1002, various other combinations of upstream and downstream digital and analog signals can be aggregated, processed, routed.

Figure 12:
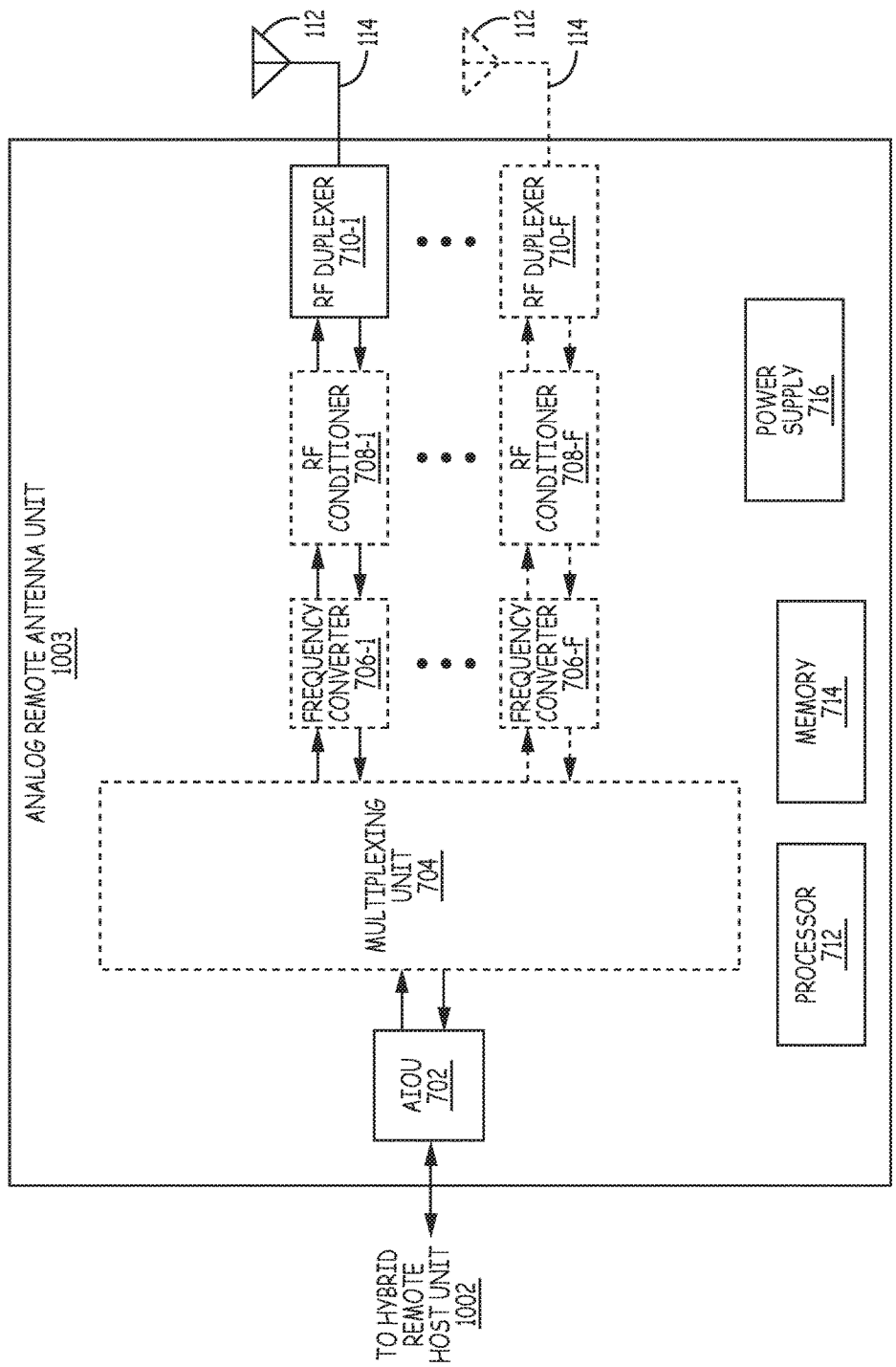
FIG. 12 is a block diagram of an exemplary embodiment of an analog remote antenna unit shown in FIG. 10.

In the embodiments described and depicted in FIG. 12, the term analog intermediate frequency (IF) spectrum is used to describe the analog signals transported between the hybrid remote host unit 1002 and the analog remote antenna units 1003. The term analog IF spectrum is used to distinguish the signals from the analog RF spectrum format that is communicated to the base station transceivers 102 and the wireless devices 103 over the air. Example hybrid DAS 1000 uses analog IF spectrum for transport between the hybrid remote host unit 1002 and the analog remote antenna units 1003 that is lower in frequency than the analog RF spectrum. In other example embodiments, the RF spectrum can be transmitted at its native frequency within the analog domain or using an analog IF spectrum that is higher in frequency than the analog RF spectrum.

A diagram of an exemplary embodiment of analog remote antenna unit 1003 is shown in FIG. 11. The analog remote antenna unit 1003 is similar to the analog remote antenna unit 506 and operates as described above. The differences between analog remote antenna unit 1003 and analog remote antenna unit 506 relate to the connection between the analog remote antenna unit 1003 and the hybrid remote host unit 1002. Only these difference are described below.

While the analog remote antenna unit 1003 shown in FIG. 11 is coupled to a hybrid remote host unit 1002 using a single analog communication link, in some embodiments this single analog communication link includes a plurality of coaxial cables, optical fibers, twisted pair or other suitable analog communication media or a combination thereof. In some embodiments using a single optical fiber, the analog remote antenna unit 1003 is coupled to the single optical fiber 110 through a wavelength divisional multiplexer (WDM) that multiplexes both the downlink and uplink signals onto the single optical fiber. In other embodiments, this single analog communication link includes only one coaxial cable, optical fiber, twisted pair, or other suitable analog media or a combination thereof. In exemplary embodiments, the single analog communication link is across a wireless medium, such as air, and is transmitted using wireless technology, such as radio frequency signals or optical signals.

FIG. 13 is a block diagram of one exemplary embodiment of an optimized digital distributed antenna system (DAS) 1300 in which dynamic capacity allocation and/or power level adjustment techniques described here can be implemented. Although the dynamic capacity allocation and/or power level adjustment techniques described here are described in connection with an optimized digital DAS 1300 shown in FIG. 13, it is to be understood that the dynamic capacity allocation and/or power level adjustment techniques described here can be used in other DAS, repeater, or distributed base station products and systems (for example, a "pure" analog DAS, a non-optimized digital DAS, an optimized-BTS DAS, or a hybrid digital DAS).

The optimized digital DAS 1300 is similar to digital DAS 100. The differences between optimized digital DAS 1300 and digital DAS 100 relate to the connection between the base station transceivers 1302 and the optimized digital remote host unit 1304 and include differences in the internal components of the optimized digital remote host unit 1304. Only these differences from digital DAS 100 are described below.

Digitized baseband (or digitized intermediate frequency) representations of the bi-directional radio frequency bands are communicated between the base station transceivers 1302 and the optimized digital remote host unit 1304. Thus, each base station transceiver 1302 has been optimized to provide digitized samples of the downlink of a corresponding bi-directional radio frequency band to the optimized digital remote host unit 1304 across at least one of communication links 1303. Similarly, each base station transceiver 1302 has been optimized to receive digitized samples of the uplink of a corresponding bi-directional radio frequency band from the optimized digital remote host unit 1304 across at least one of communication links 1303.

A block diagram of an exemplary embodiment of the optimized digital remote host unit 1304 is shown in FIG. 14. In the particular embodiment shown in FIG. 14, the optimized digital remote host unit 1304 does not require the digital-analog conversion unit (DACU) 202 required in digital remote host unit 104 shown in FIG. 2. This is because the signals being received from and transmitted to the base station transceivers 1302 from the optimized digital remote host unit 1304 are digitized samples because of the optimizations to the base station transceivers 1302. This is more efficient because the signals are not first up-converted to radio frequencies from baseband at the base station transceivers 1302, communicated with the digital remote host unit 104 and subsequently down-converted from radio frequencies at the digital remote host unit 104. The up and down conversion to radio frequencies is no longer required, allowing for simpler and cheaper design of the optimized digital remote host unit 1304 and mitigating unnecessary noise potentially introduced through the up and down conversions.

In the particular embodiment shown in FIG. 14, the optimized digital remote host unit 1304 includes at least one switching unit 204, at least one attribute analyzer 206 (for example, attribute analyzer 206-1 through 206-B), at least one digital input/output unit (DIOU) 208 (such as DIOU 208-1 through 208-B), at least one processor 210, at least one memory 212, at least one computer readable storage medium 214, and at least one power supply 216. These components operate as described above with respect to the digital remote host unit 104 shown in FIG. 2. The software 218 stored on computer readable storage medium 214, including correlation functionality 220 and capacity allocation functionality 222, operates as described above as well.

As indicated above, the remainder of optimized digital DAS 1300 operate as described above with respect to digital DAS 100 and its components shown in FIGS. 1, 3A-3B, and 4A-4C.

FIG. 15 is a block diagram of one exemplary embodiment of an optimized analog distributed antenna system (DAS) 1200 in which dynamic capacity allocation and/or power level adjustment techniques described here can be implemented. Although the dynamic capacity allocation and/or power level adjustment techniques described here are described in connection with an optimized analog DAS 1200 shown in FIG. 15, it is to be understood that the dynamic capacity allocation and/or power level adjustment techniques described here can be used in other DAS, repeater, or distributed base station products and systems (for example, a "pure" digital DAS, a non-optimized analog DAS, or a hybrid digital DAS (which can be optimized similar to the optimized digital DAS in some implementations).

The optimized analog DAS 1200 is similar to analog DAS 500. The differences between optimized analog DAS 1200 and analog DAS 500 relate to the connection between base station transceivers 1202 and the optimized analog remote host unit 1204 and include differences in the internal components of the optimized analog remote host unit 1204. Only these differences from analog DAS 500 are described below.

Analog intermediate frequency signal representations of the bi-directional radio frequency bands are communicated between the base station transceivers 1202 and the optimized analog remote host unit 1204. Thus, each base station transceiver 1202 has been optimized to provide analog intermediate frequency signals of the downlink of a corresponding bi-directional radio frequency band to the optimized analog remote host unit 1504 across at least one of the communication links 1403. Similarly, each base station transceiver 1502 has been optimized to receive analog intermediate frequency signals of the uplink of a corresponding bi-directional radio frequency band from the optimized analog remote host unit 1504 across at least one of the communication links 1303.

A block diagram of an exemplary embodiment of the optimized analog remote host unit 1504 is shown in FIG. 16. In the particular embodiment shown in FIG. 16, the optimized analog remote host unit 1504 does not require the IF converters 602 required in analog remote host unit 504 shown in FIG. 6. This is because the signals being received from and transmitted to the base station transceivers 1502 from the optimized analog remote host unit 1504 are already analog intermediate frequency signals because of the optimizations to the base station transceivers 1502. This is more efficient because the signals are not first up-converted to radio frequency from baseband at the base station transceivers 1302, communicated with the analog remote host unit 504 and subsequently down-converted from radio frequencies to intermediate frequencies at the analog remote host unit 504. The up and down conversion to radio frequencies is no longer required, allowing for simpler and cheaper design of the optimized analog remote host unit 1504 and mitigating unnecessary noise potentially introduced through the up and down conversions.

In the particular embodiment shown in FIG. 16, the optimized analog remote host unit 1504 includes at least one switching unit 604, at least one attribute analyzer 606 (for example, attribute analyzer 606-1 through 606-E), at least one analog input/output unit (AIOU) 608 (such as AIOU 608-1 through 608-E), at least one processor 610, at least one memory 612, at least one computer readable storage medium 614, and at least one power supply 616. These components operate as described above with respect to the analog remote host unit 504 shown in FIG. 5. The software 618 stored on computer readable storage medium 614, including correlation functionality 620 and capacity allocation functionality 622, operates as described above as well.

As indicated above, the reminder of optimized analog DAS 1500 operates as described above with respect to analog DAS 500 and its components shown in FIGS. 5-6, 7A-7B, and 8-9.

Figure 17:
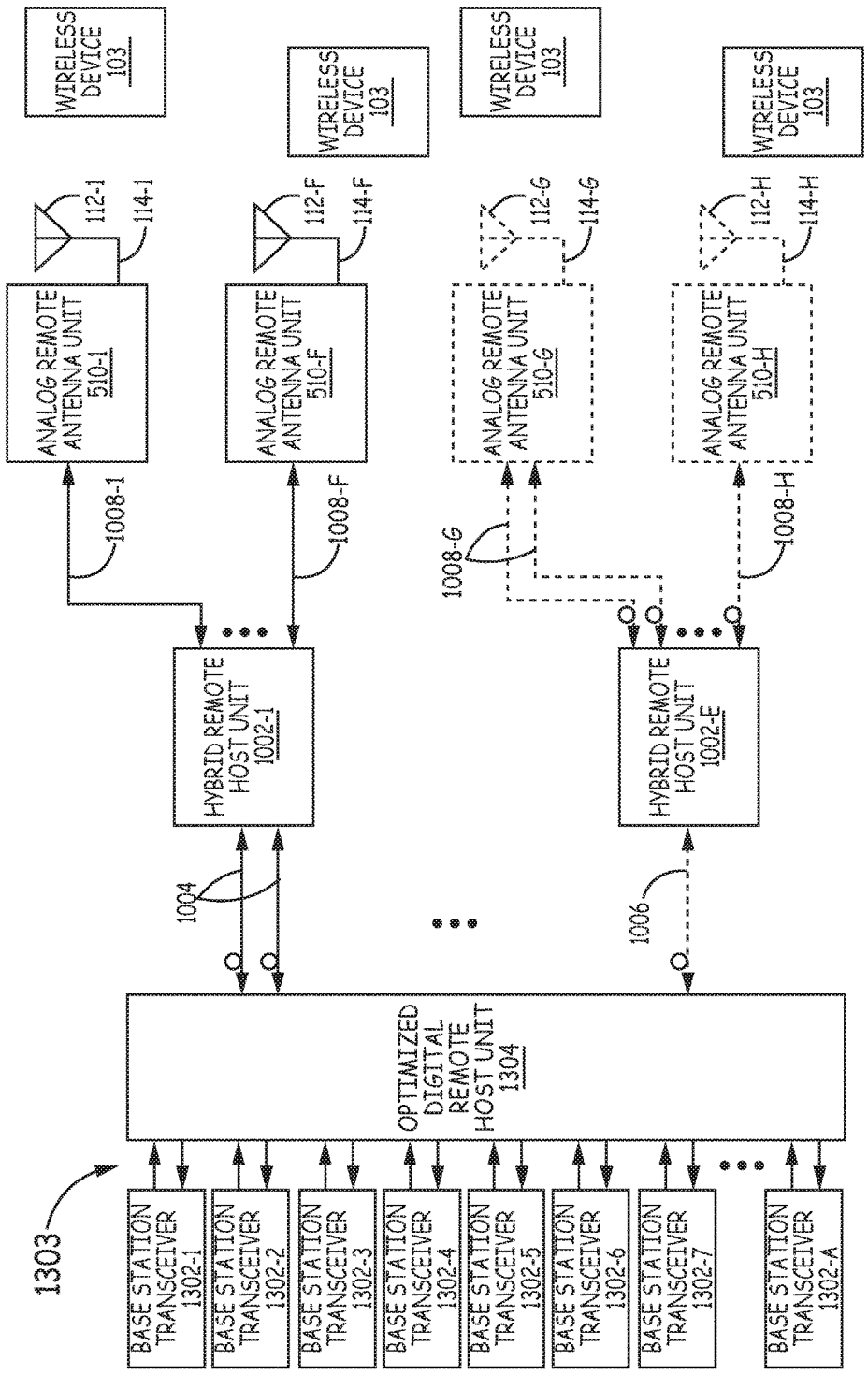
FIG. 17 is a block diagram of one exemplary embodiment of an optimized hybrid distributed antenna system.

FIG. 17 is a block diagram of one exemplary embodiment of an optimized hybrid distributed antenna system (DAS) 1700 in which dynamic capacity allocation and/or power level adjustment techniques described here can be implemented. Although the dynamic capacity allocation and/or power level adjustment techniques described here are described in connection with an optimized hybrid DAS 1700 shown in FIG. 17, it is to be understood that the dynamic capacity allocation and/or power level adjustment techniques described here can be used in other DAS, repeater, or distributed base station products and systems (for example, a "pure" analog DAS, a non-optimized digital DAS, an optimized-BTS DAS, or a hybrid digital DAS).

The optimized hybrid DAS 1700 is similar to hybrid DAS 1000. The differences between optimized hybrid DAS 1700 and hybrid DAS 1000 relate to the connection between the base station transceivers 1302 and the optimized digital remote host unit 1304 and include differences in the internal components of the optimized digital remote host unit 1304. Only these differences from hybrid DAS 1000 are described below.

Digitized baseband (or digitized intermediate frequency) representations of the bi-directional radio frequency bands are communicated between the base station transceivers 1302 and the optimized digital remote host unit 1304. Thus, each base station transceiver 1302 has been optimized to provide digitized samples of the downlink of a corresponding bi-directional radio frequency band to the optimized digital remote host unit 1304 across at least one of communication links 1303. Similarly, each base station transceiver 1302 has been optimized to receive digitized samples of the uplink of a corresponding bi-directional radio frequency band from the optimized digital remote host unit 1304 across at least one of communication links 1303.

The optimized digital remote host unit 1304 shown in FIG. 14 and described above can be used as the optimized digital remote host unit 1304 in the optimized hybrid DAS 1700. The optimized digital remote host unit 1304 operates as described above in the optimized hybrid DAS 1700. As indicated above, the remainder of optimized hybrid DAS 1700 operate as described above with respect to hybrid DAS 1000 and its components shown in FIGS. 2 and 10-12.

FIG. 18 is a flow diagram illustrating one exemplary embodiment of a method 1800 of dynamically allocating capacity at one of digital remote host unit 104, analog remote host unit 504, analog remote expansion unit 507, optimized digital remote host unit 1304, and optimized analog remote host unit 1504. The exemplary embodiment of method 1800 shown in FIG. 18 and described here, is described as being implemented in the digital remote host unit 104 shown in FIGS. 1-2, though it is to be understood that other embodiments of method 1800 can be implemented using other DAS, repeater, or distributed base station products and systems (for example, analog remote host unit 504 shown in FIGS. 5-6 and described above, analog remote expansion unit 507 shown in FIGS. 5 and 8 and described above, hybrid remote host unit 1002 shown in FIGS. 10-11, optimized digital remote host unit 1304 shown in FIG. 13-14 and described above, optimized analog remote host 1504 shown in FIG. 15-16 and described above, and a digital remote host unit 104 or optimized digital remote host unit 1304 that is part of a hybrid DAS system).

The processing of method 1800 is repeated periodically or continuously, enabling the dynamic capacity allocation and/or power level adjustment to adapt appropriately as capacity usage changes throughout the digital DAS 100.

At least one attribute of each signal is analyzed at one of the attribute analyzers 206 associated with the various signals (block 1802). As described above, these attributes may be attributes of the uplink, downlink, or both uplink and downlink signals. In some implementations, these attributes are power density of the uplink, downlink, or both uplink and downlink signals.

The analyzed attribute is correlated with a plurality of profiles to determine which profile the analyzed attribute matches best (block 1804). As described above in some implementations, these profiles are created by arranging the digital DAS 100 into a specific known usage configuration and creating a profile of this analyzed attribute in a known configuration.

The current capacity usage of the various digital remote antenna units 106 are determined by determining which profile correlates best with the signal analyzed by each of the attribute analyzers 206 (block 1806). In some implementations, the current usage amongst the digital remote antenna units 106 is determined as a percentage of the capacity currently allocated to each digital remote antenna units 106 (for example, digital remote antenna unit 106-1 may be using 100% of the capacity currently allocated to it, while digital remote antenna unit 106-2 is only using 20% of the capacity currently allocated to it).

The capacity of the digital DAS 100 is dynamically allocated based on current capacity usage (block 1808). As described above in some implementations, the capacity is dynamically allocated to digital remote antenna units 106 that need additional capacity by shifting capacity from the digital remote antenna units 106 that are currently utilizing a lower percentage of their currently allocated capacity. In some implementations, this capacity is shifted at the switching unit 204 by switching the connections between the base station transceivers 102 and the various optical fiber pairs 108 and single optical fibers 110 that lead to the digital remote antenna units 106.

EXAMPLE EMBODIMENTS

Example 1 includes a distributed antenna system comprising: a host unit operable to receive downstream signals corresponding to a plurality of downstream frequency bands, each of the plurality of downstream frequency bands associated with a respective radio frequency channel; and a plurality of remote antenna units that are communicatively coupled to the host unit; wherein the host unit is operable to communicate a downstream transport signal from the host unit to at least a first subset of the plurality of remote antenna units, wherein the downstream transport signal is derived from at least one of the downstream signals received at the host unit; wherein each remote antenna unit of the first subset is operable to use the downstream transport signal to generate a downstream radio frequency signal for radiation from an antenna associated with the remote antenna unit, wherein the downstream radio frequency signal comprises at least a subset of the plurality of downstream frequency bands; wherein each remote antenna unit of the first subset is further operable to receive an upstream radio frequency signal comprising at least one upstream frequency band, each upstream frequency band associated with a respective radio frequency channel; wherein each remote antenna unit of the subset of the plurality of remote antenna units is further operable to communicate an upstream transport signal to the host unit, wherein the upstream transport signal is derived from the upstream radio frequency signal; wherein the host unit uses the upstream transport signal to generate an upstream signal, wherein the upstream signal comprises the at least one upstream frequency band; wherein the host unit is further operable to analyze an attribute of at least one of the downstream transport signals and the upstream transport signals associated with the plurality of remote antenna units; wherein the host unit is further operable to correlate the analyzed attribute for each of the plurality of remote antenna units with a profile; wherein the host unit is further operable to determine the current capacity usage of the plurality of remote antenna units based on the correlation; and wherein the host unit is further operable to dynamically allocate capacity amongst the plurality of remote antenna units based on the determined current capacity usage.

Example 2 includes the system of Example 1, wherein the attribute is a power level of at least one of the downstream signals and the upstream signals associated with the plurality of remote antenna units.

Example 3 includes the system of any of Examples 1-2, wherein host unit is further operable to dynamically adjust the power level of at least one of the plurality of remote antenna units based on the determined current capacity usage.

Example 4 includes the system of any of Examples 1-3, wherein the host unit includes a switch used to dynamically allocate capacity by changing routing between the plurality of downstream frequency bands and the remote antenna units.

Example 5 includes the system of Example 4, wherein the switch switches communication of a first downstream frequency band of the plurality of downstream frequency bands from a first remote antenna unit to a second remote antenna unit, wherein the first remote antenna unit has a higher current capacity usage than the second remote antenna unit.

Example 6 includes the system of any of Examples 4-5, wherein the switch switches communication of a first upstream frequency band from a first remote antenna unit to a second remote antenna unit, wherein the first remote antenna unit has a higher current capacity usage than the second remote antenna unit.

Example 7 includes the system of any of Examples 1-6, wherein the downstream signals are radio frequency signals; wherein the downstream transport signal is a digitized signal including digitized samples corresponding to at least one of the plurality of downstream frequency bands; and wherein the host unit is further operable to derive the digitized samples corresponding to the at least one of the plurality of downstream frequency bands from at least one radio frequency signal of the downstream signals.

Example 8 includes the system of any of Examples 1-7, wherein the upstream transport signal is a digitized signal including digitized samples corresponding to the at least one upstream frequency band; wherein the upstream signal is an upstream radio frequency signal; and wherein the host unit is further operable to derive the upstream radio frequency signal from the digitized samples corresponding to the at least one upstream frequency band.

Example 9 includes the system of any of Examples 1-8, wherein the downstream signals are digitized signals including first digitized samples corresponding to at least one of the plurality of downstream frequency bands; wherein the downstream transport signal is a digitized signal including second digitized samples corresponding to at least one of the plurality of downstream frequency bands; and wherein the host unit is further operable to derive the second digitized samples from at least some of the first digitized samples.

Example 10 includes the system of any of Examples 1-9, wherein the upstream transport signal is a digitized signal including first digitized samples corresponding to the at least one upstream frequency band; wherein the upstream signal is a digitized signal including second digitized samples corresponding to the at least one upstream frequency band; and wherein the host unit is further operable to derive the second digitized samples from the first digitized samples.

Example 11 includes the system of any of Examples 1-10, wherein the downstream signals are radio frequency signals; wherein the downstream transport signal includes a first analog intermediate frequency signal that corresponds to at least one of the plurality of downstream frequency bands; and wherein the host unit is further operable to derive the first analog intermediate frequency signal corresponding to at least one of the plurality of downstream frequency bands from at least one radio frequency signal of the downstream signals.

Example 12 includes the system of any of Examples 1-11, wherein the upstream transport signal includes a second analog intermediate frequency signal that corresponds to a first upstream frequency band of the at least one upstream frequency band; wherein the upstream signal includes an upstream radio frequency signal derived from the second analog intermediate frequency signal corresponding to the first upstream frequency band; and wherein the host unit is further operable to derive the upstream radio frequency signal from the second analog intermediate frequency signal corresponding to the first upstream frequency band.

Example 13 includes the system of any of Examples 1-12, wherein the downstream signals include a first set of analog intermediate frequency signals; wherein the downstream transport signal includes a first analog intermediate frequency signal that corresponds to at least one of the plurality of downstream frequency bands; and wherein the host unit is further operable to derive the first analog intermediate frequency signal corresponding to at least one of the plurality of downstream frequency bands from at least one analog intermediate frequency signal of the first set of analog intermediate frequency signals included in the downstream signals.

Example 14 includes the system of any of Examples 1-13, wherein the upstream transport signal includes a second analog intermediate frequency signal that corresponds to a first upstream frequency band of the at least one upstream frequency band; wherein the upstream signal includes an upstream intermediate frequency signal derived from the second analog intermediate frequency signal corresponding to the first upstream frequency band; and wherein the host unit is further operable to derive the upstream intermediate frequency signal from the second analog intermediate frequency signal corresponding to the first upstream frequency band.

Example 15 includes a method of dynamically allocating capacity in a distributed antenna system, the method comprising: analyzing an attribute of at least one of downstream transport signals and upstream transport signals associated with each of a plurality of remote antenna units in a distributed antenna system at a host unit in the distributed antenna system; determining the capacity usage of each of the plurality of remote antenna units based on the attribute; dynamically allocating capacity amongst the plurality of remote antenna units based on the capacity usage of each of the plurality of remote antenna units.

Example 16 includes the method of Example 15, wherein the attribute is a power density of the signal.

Example 17 includes the method of Example 16, wherein determining power density of at least one of downstream transport signals and upstream transport signals associated with each of a plurality of remote antenna units in a distributed antenna system includes: analyzing the power density of the upstream transport signals received at the host unit from the plurality of remote antenna units; and quantifying the power density of the upstream transport signals received at the host unit from each of the plurality of remote antenna units as distinct values.

Example 18 includes the method of any of Examples 15-17, wherein dynamically allocating capacity amongst the plurality of remote antenna units based on the utilization of each of the plurality of remote antenna units includes: allocating a first capacity to a first remote antenna unit of the plurality of remote antenna units that has a first capacity usage; allocating a second capacity to a second remote antenna unit of the plurality of remote antenna units that has a second capacity usage; and wherein the first capacity usage is greater than the second capacity usage.

Example 19 includes the method of any of Examples 15-18, wherein dynamically allocating capacity occurs by changing routing within a switch positioned within the host unit.

Example 20 includes the method of any of Examples 15-19, wherein capacity is allocated as a percentage of the distributed antenna systems total capacity.

Example 21 includes the method of any of Examples 15-20, further comprising dynamically adjusting the power level of at least one of the plurality of remote antenna units based on the capacity usage of each of the plurality of remote antenna units.

Example 22 includes a host unit for use in a distributed antenna system comprising: a plurality of base station transceiver interfaces operable to communicate signals with a plurality of base station transceivers; a switching unit communicatively coupled to the plurality of base station transceiver interfaces; a plurality of attribute analyzers coupled to the switching unit; a plurality of transport interfaces coupled to the plurality of attribute interfaces and operable to communicate transport signals with a plurality of remote antenna units; a processor communicatively coupled to the plurality of attribute analyzers and the switching unit; wherein each attribute analyzer is operable to analyze and quantify an attribute of at least one of an upstream transport signal of the transport signals received from a remote antenna unit of the plurality of remote antenna units and a downstream transport signal of the transmit signals transmitted to the remote antenna unit of the plurality of remote antenna units; wherein the processor is operable to correlate the quantified attribute received from each attribute analyzer with a plurality of profiles; wherein the processor is further operable to determine the current capacity usage of each of the plurality of remote antenna units by determining which of the plurality of profiles has the highest correlation to each quantified attribute; and wherein the processor is further operable to cause the switching unit to dynamically allocate capacity amongst the plurality of remote antenna units based on the determined current capacity usage.

Example 23 includes the host unit of Example 22, wherein the attribute is a power level.

Example 24 includes the host unit of any of Examples 22-23, wherein the processor determines that a first remote antenna unit of the plurality of remote antenna units has a higher current capacity usage than a second remote antenna unit of the plurality of remote antenna units; and wherein the processor causes the switching unit to switch capacity provided by a first base station transceiver interface of the plurality of base station transceiver interfaces from a second transport signal of the transport signals communicated to the second remote antenna unit to a first transport signal of the transport signals communicated to the first remote antenna unit.

Example 25 includes the host unit of any of Examples 22-24, wherein the processor determines that a first remote antenna unit of the plurality of remote antenna units has a higher current capacity usage than a second remote antenna unit of the plurality of remote antenna units; and wherein the processor causes the switching unit to switch to receive upstream transport signals from the first remote antenna unit instead of the from the second remote antenna unit.

Example 26 includes the host unit of any of Examples 22-25, further comprising wherein the processor is further operable to cause the switching unit to dynamically adjust the power level of at least one of the plurality of remote antenna units based on the determined current capacity usage.

Example 27 includes the host unit of any of Examples 22-26, wherein the signals communicated with the plurality of base station transceivers are radio frequency signals; wherein the host unit further comprises a frequency converter operable to frequency convert between radio frequency signals from the signals communicated with the plurality of base station transceivers and intermediate frequency signals from the transport signals communicated with the plurality of remote antenna units.

Example 28 includes the host unit of Example 27, wherein the transport signals communicated with the plurality of remote antenna units are digitized intermediate frequency signals having digitized samples; and wherein the host unit further comprises a digitizer that digitizes the intermediate frequency signals into digitized samples.

Example 29 includes the host unit of any of Examples 27-28, wherein the transport signals communicated with the plurality of remote antenna units are analog intermediate frequency signals.

Example 30 includes the host unit of any of Examples 22-29, wherein the signals communicated with the plurality of base station transceivers are digitized intermediate frequency signals having digitized samples.

Example 31 includes the host unit of any of Examples 22-30, wherein the signals communicated with the plurality of base station transceivers are analog intermediate frequency signals.

What is claimed is:

1. A distributed antenna system comprising:
a host unit configured to receive downstream signals corresponding to a plurality of downstream frequency bands, each of the plurality of downstream frequency bands associated with a respective radio frequency channel; and
a plurality of remote antenna units that are communicatively coupled to the host unit;
wherein the host unit is configured to communicate a downstream transport signal from the host unit to at least a first subset of the plurality of remote antenna units,
wherein the downstream transport signal is derived from at least one of the downstream signals received at the host unit;
wherein each remote antenna unit of the first subset is configured to use the downstream transport signal to generate a downstream radio frequency signal for radiation from an antenna associated with the remote antenna unit, wherein the downstream radio frequency signal comprises at least a subset of the plurality of downstream frequency bands;
wherein each remote antenna unit of the first subset is further configured to receive an upstream radio frequency signal comprising at least one upstream frequency band, each upstream frequency band associated with a respective radio frequency channel;
wherein each remote antenna unit of the subset of the plurality of remote antenna units is further configured to communicate an upstream transport signal to the host unit, wherein the upstream transport signal is derived from the upstream radio frequency signal;
wherein the host unit uses the upstream transport signal to generate an upstream signal, wherein the upstream signal comprises the at least one upstream frequency band;
wherein the host unit is further configured to analyze an attribute of at least one of the downstream transport signals and the upstream transport signals associated with the plurality of remote antenna units, wherein the attribute is associated with at least one of power, integrity, and noise of the at least one of the downstream transport signals or the upstream transport signals;
wherein the host unit is further configured to correlate the analyzed attribute for each of the plurality of remote antenna units with a plurality of profiles associated with different usage patterns for the remote antenna units to determine which of the plurality of profiles matches the analyzed attributes best;
wherein the host unit is further configured to determine the current capacity usage of the plurality of remote antenna units based on the correlation; and
wherein the host unit is further configured to dynamically allocate capacity amongst the plurality of remote antenna units based on the determined current capacity usage.

2. The system of claim 1, wherein host unit is further configured to dynamically adjust the power level of at least one of the plurality of remote antenna units based on the determined current capacity usage.

3. The system of claim 1, wherein the host unit includes a switch used to dynamically allocate capacity by changing routing between the plurality of downstream frequency bands and the remote antenna units.

4. The system of claim 3, wherein the switch switches communication of a first downstream frequency band of the plurality of downstream frequency bands from a first remote antenna unit to a second remote antenna unit, wherein the first remote antenna unit has a higher current capacity usage than the second remote antenna unit.

5. The system of claim 3, wherein the switch switches communication of a first upstream frequency band from a first remote antenna unit to a second remote antenna unit, wherein the first remote antenna unit has a higher current capacity usage than the second remote antenna unit.

6. The system of claim 1, wherein the downstream signals are radio frequency signals;
wherein the downstream transport signal is a digitized signal including digitized samples corresponding to at least one of the plurality of downstream frequency bands; and
wherein the host unit is further configured to derive the digitized samples corresponding to the at least one of the plurality of downstream frequency bands from at least one radio frequency signal of the downstream signals.

7. The system of claim 1, wherein the upstream transport signal is a digitized signal including digitized samples corresponding to the at least one upstream frequency band;
wherein the upstream signal is an upstream radio frequency signal; and
wherein the host unit is further configured to derive the upstream radio frequency signal from the digitized samples corresponding to the at least one upstream frequency band.

8. The system of claim 1, wherein the downstream signals are digitized signals including first digitized samples corresponding to at least one of the plurality of downstream frequency bands;

wherein the downstream transport signal is a digitized signal including second digitized samples corresponding to at least one of the plurality of downstream frequency bands; and wherein the host unit is further configured to derive the second digitized samples from at least some of the first digitized samples.

9. The system of claim 1, wherein the upstream transport signal is a digitized signal including first digitized samples corresponding to the at least one upstream frequency band;

wherein the upstream signal is a digitized signal including second digitized samples corresponding to the at least one upstream frequency band; and wherein the host unit is further configured to derive the second digitized samples from the first digitized samples.

10. The system of claim 1, wherein the downstream signals are radio frequency signals;

wherein the downstream transport signal includes a first analog intermediate frequency signal that corresponds to at least one of the plurality of downstream frequency bands; and wherein the host unit is further configured to derive the first analog intermediate frequency signal corresponding to at least one of the plurality of downstream frequency bands from at least one radio frequency signal of the downstream signals.

11. The system of claim 1, wherein the upstream transport signal includes a second analog intermediate frequency signal that corresponds to a first upstream frequency band of the at least one upstream frequency band;

wherein the upstream signal includes an upstream radio frequency signal derived from the second analog intermediate frequency signal corresponding to the first upstream frequency band; and wherein the host unit is further configured to derive the upstream radio frequency signal from the second analog intermediate frequency signal corresponding to the first upstream frequency band.

12. The system of claim 1, wherein the downstream signals include a first set of analog intermediate frequency signals;

wherein the downstream transport signal includes a first analog intermediate frequency signal that corresponds to at least one of the plurality of downstream frequency bands; and wherein the host unit is further configured to derive the first analog intermediate frequency signal corresponding to at least one of the plurality of downstream frequency bands from at least one analog intermediate frequency signal of the first set of analog intermediate frequency signals included in the downstream signals.

13. The system of claim 1, wherein the upstream transport signal includes a second analog intermediate frequency signal that corresponds to a first upstream frequency band of the at least one upstream frequency band;

wherein the upstream signal includes an upstream intermediate frequency signal derived from the second analog intermediate frequency signal corresponding to the first upstream frequency band; and wherein the host unit is further configured to derive the upstream intermediate frequency signal from the second analog intermediate frequency signal corresponding to the first upstream frequency band.

14. A method of dynamically allocating capacity in a distributed antenna system, the method comprising:

analyzing an attribute of at least one of downstream transport signals and upstream transport signals associated with each of a plurality of remote antenna units in a distributed antenna system at a host unit in the distributed antenna system, wherein the attribute is associated with at least one of power, integrity, and noise of the at least one of the downstream transport signals or the upstream transport signals;

correlating the analyzed attribute for each of the plurality of remote antenna units with a plurality of profiles associated with different usage patterns for the remote antenna units to determine which of the plurality of profiles matches the analyzed attributes best;

determining the current capacity usage of each of the plurality of remote antenna units based on the correlation;

dynamically allocating capacity amongst the plurality of remote antenna units based on the current capacity usage of each of the plurality of remote antenna units.

15. The method of claim 14, wherein determining power density of at least one of downstream transport signals and upstream transport signals associated with each of a plurality of remote antenna units in a distributed antenna system includes:

analyzing the power density of the upstream transport signals received at the host unit from the plurality of remote antenna units; and quantifying the power density of the upstream transport signals received at the host unit from each of the plurality of remote antenna units as distinct values.

16. The method of claim 14, wherein dynamically allocating capacity amongst the plurality of remote antenna units based on the utilization of each of the plurality of remote antenna units includes:

allocating a first capacity to a first remote antenna unit of the plurality of remote antenna units that has a first capacity usage;

allocating a second capacity to a second remote antenna unit of the plurality of remote antenna units that has a second capacity usage; and wherein the first capacity usage is greater than the second capacity usage.

17. The method of claim 14, wherein dynamically allocating capacity occurs by changing routing within a switch positioned within the host unit.

18. The method of claim 14, further comprising dynamically adjusting the power level of at least one of the plurality of remote antenna units based on the capacity usage of each of the plurality of remote antenna units.

19. A host unit for use in a distributed antenna system comprising:

a plurality of base station transceiver interfaces configured to communicate signals with a plurality of base station transceivers;

a switching unit communicatively coupled to the plurality of base station transceiver interfaces;

a plurality of attribute analyzers coupled to the switching unit;

a plurality of transport interfaces coupled to the plurality of attribute analyzers and configured to communicate transport signals with a plurality of remote antenna units;

a processor communicatively coupled to the plurality of attribute analyzers and the switching unit;

wherein each attribute analyzer is configured to analyze and quantify an attribute of at least one of an upstream transport signal of the transport signals received from a remote antenna unit of the plurality of remote antenna units and a downstream transport signal of the transmit signals transmitted to the remote antenna unit of the plurality of remote antenna units, wherein the attribute is associated with at least one of power, integrity, and noise of the at least one of the downstream transport signals or the upstream transport signals;

wherein the processor is configured to correlate the quantified attribute received from each attribute analyzer with a plurality of profiles associated with different usage patterns for the remote antenna units to determine which of the plurality of profiles matches the analyzed attributes best;

wherein the processor is further configured to determine the current capacity usage of each of the plurality of remote antenna units by determining which of the plurality of profiles has the highest correlation to each quantified attribute; and wherein the processor is further configured to cause the switching unit to dynamically allocate capacity amongst the plurality of remote antenna units based on the determined current capacity usage.

20. The host unit of claim 19, wherein the processor determines that a first remote antenna unit of the plurality of remote antenna units has a higher current capacity usage than a second remote antenna unit of the plurality of remote antenna units; and wherein the processor causes the switching unit to switch capacity provided by a first base station transceiver interface of the plurality of base station transceiver interfaces from a second transport signal of the transport signals communicated to the second remote antenna unit to a first transport signal of the transport signals communicated to the first remote antenna unit.

21. The host unit of claim 19, wherein the processor determines that a first remote antenna unit of the plurality of remote antenna units has a higher current capacity usage than a second remote antenna unit of the plurality of remote antenna units; and wherein the processor causes the switching unit to switch to receive upstream transport signals from the first remote antenna unit instead of from the second remote antenna unit.

22. The host unit of claim 19, further comprising wherein the processor is further configured to cause the switching unit to dynamically adjust the power level of at least one of the plurality of remote antenna units based on the determined current capacity usage.

* * * * *